(12) United States Patent
Komada

(10) Patent No.: US 7,306,852 B2
(45) Date of Patent: Dec. 11, 2007

(54) GAS BARRIER FILM

(75) Inventor: Minoru Komada, Tokyo (JP)

(73) Assignee: Dai Nippon Printing Co.,Ltd., Tokyo-to (JP)

( * ) Notice: Subject to any disclaimer, the term of this patent is extended or adjusted under 35 U.S.C. 154(b) by 30 days.

(21) Appl. No.: 11/078,505

(22) Filed: Mar. 11, 2005

(65) Prior Publication Data

US 2006/0029757 A1 Feb. 9, 2006

Related U.S. Application Data

(63) Continuation of application No. 10/164,952, filed on Jun. 6, 2002, now Pat. No. 6,905,769.

(30) Foreign Application Priority Data

Jun. 8, 2001 (JP) .............................. 2001-174856

(51) Int. Cl.
*B32B 9/04* (2006.01)
*B32B 27/28* (2006.01)

(52) U.S. Cl. .................... 428/446; 428/421; 428/447; 428/702; 428/1.5; 428/1.51; 428/1.52; 427/255.27; 427/255.7

(58) Field of Classification Search ............... None
See application file for complete search history.

(56) References Cited

U.S. PATENT DOCUMENTS

| | | | |
|---|---|---|---|
| 4,119,533 A | 10/1978 | Saitoh et al. | |
| 5,387,449 A | 2/1995 | Kunz et al. | |
| 5,800,918 A | 9/1998 | Chartier et al. | |
| 5,925,479 A | 7/1999 | Wei et al. | |
| 5,939,205 A | 8/1999 | Yokoyama et al. | |
| 6,242,102 B1 | 6/2001 | Tomka | |
| 6,582,823 B1 | 6/2003 | Sakhrani et al. | |
| 6,660,392 B2 * | 12/2003 | Yamaguchi et al. | 428/446 |
| 6,664,137 B2 * | 12/2003 | Weaver | 438/125 |
| 2002/0028336 A1 | 3/2002 | Jaccoud | |
| 2003/0026965 A1 | 2/2003 | Richard | |
| 2004/0209126 A1 * | 10/2004 | Ziegler et al. | 428/702 |
| 2005/0079380 A1 * | 4/2005 | Iwanaga | 428/688 |

FOREIGN PATENT DOCUMENTS

| | | |
|---|---|---|
| EP | 1287982 A1 | 3/2003 |
| JP | 6-23903 * | 2/1994 |
| JP | 7-204581 | 8/1995 |
| JP | 8-176326 | 7/1996 |
| JP | 11-309815 | 11/1999 |
| JP | 2000-006301 | 1/2000 |
| JP | 2000-177045 | 6/2000 |
| JP | 2000318081 A | 11/2000 |

OTHER PUBLICATIONS

"Polymers at Interfaces"; Journal of Polymer Science, Part C, Polymer Symposia; John Wiley and Sons, 1971, p. 27.
Notice of Rejection of Japanese patent application No. 2002-135178 with English translation.

* cited by examiner

*Primary Examiner*—Marc S. Zimmer
(74) *Attorney, Agent, or Firm*—Seyfarth Shaw LLP

(57) ABSTRACT

It is an object of the present invention to provide a gas barrier film improved in gas barrier characteristics by decreasing the adsorbent of the surface of a gas barrier layer to water and the like. The present invention attains the above object by providing a gas barrier film comprising a substrate, a gas barrier layer which is a vacuum deposition film, formed on one surface or both surfaces of the above substrate, and a water-repellent layer which is a film having water repellency, formed on the above gas barrier layer.

18 Claims, 10 Drawing Sheets

GAS BARRIER FILM

CROSS REFERENCE TO RELATED APPLICATION

This application is a Continuation of U.S. patent application Ser. No. 10/164,952, now U.S. Pat. No. 6,905,769 entitled "GAS BARRIER FILM", filed Jun. 6, 2002 which claims priority of Japanese patent application serial numbers 2001-174856, filed Jun. 8, 2001.

DETAILED DESCRIPTION OF THE INVENTION

1. Field of the Invention

The present invention relates to a gas barrier film which is primarily used as a wrapping material for foods, medicinal supplies and the like, and as a packaging material or a substrate for electronic devices and the like.

2. Description of the Related Art

Gas barrier films are used as wrapping materials for foods, medicinal supplies and the like to avoid the influence of oxygen, water vapor, and the like which are the causes of a change in the qualities of the contents primarily. These gas barrier films are also used as packaging materials or substrates for electronic devices to avoid the event that the elements formed in liquid crystal display panels and light emitting diode (LED) display panels are deteriorated in their performance when they are in contact with oxygen and water vapor. Also, in recent years, there is the case where these gas barrier films are used to impart flexibility and shock resistance to parts currently using glass or the like.

Such a gas barrier film generally has a structure in which using a plastic film as a substrate, a gas barrier layer is formed on one surface or both surfaces of the plastic film. And, the gas barrier film is formed using various methods such as a CVD deposition, PVD deposition, and sputtering deposition. Even in the case of using any method, a current gas barrier film only has an oxygen transmission rate (OTR) of the order of 2 cc/m$^2$/day·atm and a water vapor transmission rate (WVTR) of the order of 2 g/m$^2$/day, which are still insufficient level in the case where it is used in applications requiring higher gas barrier characteristics.

As a method of forming a film having gas barrier characteristics on a high molecular resin substrate by dry deposition, a method of forming a silicon oxide film (silica film) or an aluminum oxide film (alumina film) by using a dry deposition method such as a plasma CVD deposition is known (for example, Japanese Patent Application Laid-Open No. 8-176326, Japanese Patent Application Laid-Open No. 11-309815 and Japanese Patent Application Laid-Open No. 2000-6301). Particularly, a plasma CVD deposition has the advantage that a silicon oxide film or an aluminum oxide film having excellent gas barrier characteristics and bending characteristics can be formed without giving thermal damages to a high molecular resin substrate.

However, because the surfaces of such a silicon oxide film or aluminum oxide film are hydrophilic, there is the problem that it is difficult to more improve oxygen transmission rate (OTR) and water vapor transmission rate (WVTR). Namely, the aforementioned oxygen transmission rate (OTR) and water vapor transmission rate (WVTR) are said to be determined by the adsorbent of the surface of a gas barrier layer to water and the diffusion coefficient of the gas barrier layer to itself. Here, the aforementioned silicon oxide film and aluminum oxide film greatly contributes to gas barrier characteristics from the viewpoint of diffusion coefficient. However, a vacuum deposition film of an inorganic oxide such as a silicon oxide film is hydrophilic in general so that water tends to adhere to the surface and there is therefore a problem that this adversely affects the gas barrier characteristics.

Problem to be Solved by the Invention

The present invention has been made in view of the aforementioned problem and it is a major object of the present invention to provide a gas barrier film improved in gas barrier characteristics by decreasing the adsorbent of the surface of a gas barrier layer to water and the like.

Means for Solving the Problem

In order to attain the above object, as described in claim 1, the present invention provides a gas barrier film comprising a substrate, a gas barrier layer which is a vacuum deposition film, formed on one surface or both surfaces of the above substrate, and a water-repellent layer which is a film having water repellency, formed on the above gas barrier layer.

According to this invention, the water-repellent layer having water repellency is formed on the surface of the gas barrier layer and the adsorbent of the surface of the gas barrier layer to water and the like can be decreased, whereby the gas barrier characteristics of the whole can be improved.

In the invention described in the above claim 1, also the contact angle with water on the surface of the above water-repellent layer is preferably 60° or more (measuring temperature: 23° C.). This is because such a layer having water-repellency equal to such a level prevents a reduction in gas barrier characteristics caused by the adsorbent of water and the like to the surface.

Further, in the invention described in the above claim 1 or claim 2, as described in claim 3, the above water-repellent layer is preferably a layer formed by a vacuum deposition method. This reason is that since the gas barrier layer in the present invention is formed by a vacuum deposition method, the water-repellent layer is also formed by a vacuum deposition method whereby a gas barrier film can be formed efficiently. This reason is also that the film thickness may be decreased as a whole if the water-repellent layer is designed to be a vacuum deposition film, and there are the case of laminating the gas barrier layer and the water-repellent layer as will be mentioned later and the case where a thin film is rather preferable depending on use.

In the invention described in the above claim 3, as described in claim 4, the above water-repellent layer is preferably an organic film comprising a metal skeleton and having a methyl group, an organic film constituted of only CH or a film containing F.

Specifically, as described in claim 5, the above organic film comprising a metal skeleton and having a methyl group is an organic silicon type material represented by $Si_x(CH_3)_y$ or $(SiO)_x(CH_3)_y$, or its polymer film and as described in a seventh aspect, the above film containing fluorine (F) is an organic silicon fluoride material represented by $Si_xC_yF_z$ or its polymer film, a silicon fluoride material represented by $Si_xF_y$ or its polymer film, or a fluorine-containing hydrocarbon type material represented by $C_xF_y$ or its polymer film.

In the invention described in any one of the above claims 3 to 6, as described in claim 7, the film thickness of the above water-repellent layer is preferably in a range from 1 nm to 1000 nm. This reason is as follows. When the film thickness of the water-repellent layer is less than the above range, only insufficient water repellency can be obtained and therefore this is undesirable. Even if the film thickness of the water-repellent layer is thicker than the above range, this does not improve water repellency but rather gives rise to a cost demerit.

In the invention described in the above claim 1 or claim 2, as described in claim 8, on the other hand, the above water-repellent layer may be a layer obtained by melting a thermoplastic resin having water repellency and by applying the melted resin. Also, as described in a tenth aspect, the above water-repellent layer may be a layer obtained by applying a water-repellent layer-forming coating solution prepared by dissolving or suspending a water-repellent layer-forming material having water repellency in a solvent. This is because this layer can be formed more simply than the aforementioned water-repellent layer formed by a vacuum deposition method in the formation of the water-repellent layer and also, the material or substrate which has been used as a water-repellent material may be used as it is.

Furthermore, in the invention described in any one of the above claims 1 to 9, as described in claim 10, the above gas barrier layer is preferably a transparent layer comprising an inorganic oxide. This is because it is occasionally demanded of wrapping materials or substrates to have transparency as well as gas barrier characteristics in, for example, packaging applications and it is therefore preferable to adopt a transparent layer comprising of an inorganic oxide as the gas barrier layer in such applications.

In the invention described in the above claim 10, as described in claim 11, the above gas barrier layer is preferably a silicon oxide film formed by a CVD deposition. This reason is that if a CVD deposition is used, the gas barrier layer can be formed without doing thermal damages to the substrate and further it is preferable to adopt the silicon oxide film in view of gas barrier characteristics.

In the invention described in the above claim 12, as described in claim 11, the above silicon oxide film preferably has an element compositional ratio of 170 to 200 O atoms and 30 or less C atoms to 100 Si atoms and also has IR absorption based on Si—O—Si stretching vibration between 1055 $cm^{-1}$ and 1065 $cm^1$.

The gas barrier film can be made to have very excellent gas barrier characteristics by controlling the characteristics including the element compositional ratio and IR absorption of the silicon oxide film which functions as the gas barrier layer. The silicon oxide film having such characteristics may be regarded as a $SiO_2$-like film which is minute and is reduced impurities.

In the invention described in the above claim 12, as described in claim 13, the above silicon oxide film preferably has a refractive index of 1.45 to 1.48. This is because the gas barrier characteristics can be more improved by controlling the refractive index of the silicon oxide film which functions as the gas barrier film within the above range.

In the invention described in any one of the above claims 11 to 13, as described in claim 14, the above silicon oxide film preferably has a thickness of 5 to 300 nm. This reason is that even in the case of forming a very thin vacuum deposition film as small as 5 to 300 nm, excellent gas barrier characteristics can be exhibited and the vacuum deposition film is cracked with difficulty. Also, the gas barrier film for which a vacuum deposition film is formed in the thickness falling in the above range does not damage transparency and outward appearance and also can suppress an increase in the curling of a film, which is preferable from the viewpoint of productivity.

In the invention described in any one of the above claims 1 to 14, as described in claim 15, the aforementioned gas barrier layer and water-repellent layer are preferably laminated plurally in this order on the substrate. This is because the lamination of plural layers more improves the gas barrier characteristics.

In the invention described in any one of the above claims 1 to 15, as described in claim 16, it is preferable that the oxygen transmission rate be 0.5 $cc/m^2/day \cdot atm$ or less and the water vapor transmission rate be 0.5 $g/m^2/day$ or less. This is because when the oxygen transmission rate and water vapor transmission rate are made to fall in the above range, oxygen and water vapor causing a change in the qualities of the content are not almost transmitted and therefore the gas barrier film may be preferably used in applications for which high gas barrier characteristics are required.

Further in the present invention, as described in claim 17, there is provided a laminate material comprising a heat sealing resin layer formed on at least one surface of the gas barrier film described in any one of the above claims 1 to 16. The use of such a laminate material, as described in claim 18, makes it possible to obtain a packaging container by thermally fusing the heat sealing resin layer of the above laminate material to carry out bag-making or box-making. This packaging container may be preferably used as packaging materials or substrates for foods, medicinal supplies, and electronic devices because of excellent gas barrier characteristics.

Moreover in the present invention, as described in claim 19, there is provided a laminate material comprising a conductive layer disposed on at least one surface of the gas barrier film described in any one of the above claims 1 to 16. The use of such a laminate material, as described in claim 20, enables the formation of an image display medium by forming an image display layer on the above conductive layer. Because this image display medium is provided with the substrate having excellent gas barrier characteristics, it can be made to have high weatherability and the like.

PREFERRED EMBODIMENT OF THE INVENTION

A gas barrier film according to the present invention will be explained in detail with reference to drawings.

FIG. 1 is a schematic sectional view showing one example of the structure of the gas barrier film of the present invention. As shown in FIG. 1, a gas barrier film 1 in this example is constituted of a substrate 2, a gas barrier layer 3 formed on both surfaces or one surface of the substrate 2, and a water-repellent layer 4 formed on the gas barrier layer 3. These water-repellent layer 4, gas barrier layer 3, and substrate 2, and further a method for the production of this gas barrier film will be explained separately hereinbelow.

A. Water-repellent Layer

No particular limitation is imposed on the water-repellent layer used in the present invention as far as it is formed on the gas barrier layer and has a layer having water-repellency. Since the water-repellent layer has water repellency, the quantity of water and oxygen adsorbed to the surface can be decreased with the result that the gas barrier characteristics can be improved.

The water-repellent layer used in the present invention preferably has such surface water repellency that the contact angle with water on the surface of the water-repellent layer is 60° or more and particularly 80° or more at a measuring temperature of 23° C. This is because if the contact angle with water is of this order or more, a reduction in gas barrier characteristics which reduction is caused by the adsorption of water and the like to the surface can be prevented.

Here, the contact angle with water is a value found by a method of measurement using a contact angle measuring device (Model CA-Z) manufactured by Kyowa Interface Science Co., LTD. Specifically, a method is used in which one droplet (fixed amount) of pure water is dripped on the surface of a subject to be measured and after a given period of time passes, the shape of the water droplet is observed using a microscope or a CCD camera to find the contact angle physically. The contact angle with water which is measured using this method is adopted as the contact angle with water which is defined in the present invention.

Such a water-repellent layer may be formed using any method as far as it has a water repellency as mentioned above. To state more concretely, the water-repellent layer may be those formed by a vacuum deposition method or those formed by applying a water-repellent layer-forming coating solution prepared by dissolving and suspending a water-repellent-forming material in a solvent. Also, those prepared by using a thermoplastic resin and by melting and applying the resin and those formed using, for example, a method of applying a dry film may be acceptable.

In the present invention, the water-repellent layer formed by a vacuum deposition method is preferable taking it into account that the gas barrier layer which will be explained later is formed by a vacuum deposition method and the gas barrier layer and the water-repellent layer can be formed successively in the same vacuum deposition apparatus. Further, a water-repellent layer formed by a CVD deposition may be said to be particularly preferable in the point that it can be formed without giving thermal damages to the substrate.

On the other hand, a water-repellent layer formed by a method in which a water-repellent layer-forming coating solution is applied or a method in which a thermoplastic resin is melted and applied as aforementioned is preferable taking it into account that a current water-repellent material can be used as it is and even materials which cannot be applied to a vacuum deposition method can be used.

Materials constituting such a water-repellent layer are largely different depending on a method of forming a water-repellent layer as aforementioned. Specifically, as examples of the material constituting the water-repellent layer in the case of forming the water-repellent layer by a vacuum deposition method, organic films comprising a metal skeleton and having a methyl group, organic films constituted only of CH and films containing F may be given. Each film will be explained hereinbelow.

1. Organic Film Comprising a Metal Skeleton and Having a Methyl Group

Examples of the metal skeleton of such an organic film may include Si and Al. Specific examples of the material include organic silicon type materials represented by $Si_x(CH_3)_y$ or $(SiO)_x(CH_3)_y$ or films of polymers of these materials prepared using a plasma CVD deposition or a plasma polymerization method.

2. Organic Film Constituted Only of CH

Specific examples of the organic film may include hydrocarbon type materials or films of polymers of these materials. As a method of the production of such a film, a plasma CVD deposition (plasma polymerization method) may be used. Also, those prepared by vacuum deposition a polyolefin material such as polyethylene by a PVD deposition are acceptable.

3. Film Containing F

Examples of the film containing F may include organic silicon fluoride materials represented by $Si_xC_yF_z$ or films of polymers of these materials, silicon fluoride type materials represented by $Si_xF_y$ or films of polymers of these materials, or fluorine-containing hydrocarbon type materials represented by $C_xF_y$ or films of polymers of these materials.

Also, examples of the materials constituting the water-repellent layer in the case of forming by applying the water-repellent layer-forming coating solution may include fluorine type organic materials, polyolefin type organic materials, and methyl group-containing silicon materials.

Further, examples of the materials constituting the water-repellent layer in the case of forming the water-repellent layer by melting and applying a thermoplastic resin may include olefin type resins such as polyethylene type resins, polypropylene type resins, and cyclic polyolefin type resins.

Other than the above, those prepared by applying a fluororesin film or a polyolefin film such as a polyethylene film by a dry lamination method using an adhesive may be exemplified.

In the present invention, among the aforementioned materials constituting the water-repellent layer, materials used in the case of forming by a vacuum deposition method are preferable. Particularly preferable examples may include hexamethyldisiloxane (HMDSO; $(CH_3)_3SiOSi(CH_3)_3$), tetramethyldisiloxane (TMDSO; $(CH_3)_2HSiOSiH(CH_3)_2$), tetramethylsilane (TMS; $Si(CH_3)_4$), $C_2H_2$, $C_2H_4$, $CH_4$, $C_2H_6$, $CF_4$, $C_2F_2$, $C_2F_4$, $C_2F_6$, polyethylene resins, and cyclic polyolefin resins.

A preferable film thickness of such a water-repellent layer largely differs depending on its manufacturing method. Specifically, in the case where the water-repellent layer is formed by a vacuum deposition method, the film thickness is preferably in a range from 1 nm to 1000 nm and particularly preferably in a range from 5 nm to 100 nm. On the other hand, in the case of methods other than the vacuum deposition method, namely, a method in which the water-repellent layer is formed by applying a water-repellent layer-forming coating solution or a method in which a thermoplastic resin is melted and applied, the film thickness is preferably in a range from 1 μm to 100 μm and particularly preferably in a range from 1 μm to 50 μm.

When the film thickness of the water-repellent layer is lower than the above range, this gives rise to the possibility that a function as the water-repellent layer cannot be exhibited because some parts of the substrate are not covered with the water-repellent layer and is therefore undesirable. Even if the film thickness is higher than the above range, this has no effect on the water repellency, giving rise to the possibility of cost problems and is therefore undesirable.

Also, there is the case where it is demanded of the gas barrier film of the present invention to have transparency according to use. Therefore, the aforementioned water-repellent layer is preferably transparent.

B. Gas Barrier Layer

No particular limitation is imposed on the gas barrier layer used in the present invention as far as it is a vacuum deposition film formed on the substrate to impart gas barrier characteristics and the gas barrier layer may be either a transparent film or a opaque film.

Examples of the type of film in the case where the vacuum deposition film is a transparent film include aluminum oxide, zinc oxide, antimony oxide, indium oxide, cerium oxide, calcium oxide, cadmium oxide, silver oxide, gold oxide, chromium oxide, silicon oxide, cobalt oxide, zirconium oxide, tin oxide, titanium oxide, iron oxide, copper oxide, nickel oxide, platinum oxide, palladium oxide, bismuth oxide, magnesium oxide, manganese oxide, molybdenum oxide, vanadium oxide, and barium oxide. Further, ITO films and the like may also be used as the vacuum deposition film of the present invention.

On the other hand, examples of the type of film when the vacuum deposition film is a opaque film may include aluminum, and silicon. Also, all metals may be used for the vacuum deposition film used in the present invention.

In the present invention, many applications, for example, in the case of using the gas barrier film as packaging materials, are required for the gas barrier film to have transparency. Therefore, in the present invention, the gas barrier layer is preferably a transparent layer. Specifically, the gas barrier layer is preferably a vacuum deposition layer of a metal oxide as aforementioned.

In the present invention, among these films, a silicon oxide film formed by a CVD deposition is preferable. This is because the formation of a film using a CVD deposition enables the formation without giving any thermal damage to the substrate and therefore the substrate is selected from materials ranging widely. Also, a silicon oxide film is a preferable material in view of productive easiness, general adaptability in applications and the like.

In the silicon oxide film like this, particularly in the present invention, it preferably has an element compositional ratio of 170 to 200 O atoms and 30 or less C atoms to 100 Si atoms and also has IR absorption based on Si—O—Si stretching vibration between 1055 and 1065 $cm^{-1}$. This is because the provision of such characteristics improves the gas barrier characteristics and can make the gas barrier characteristics extremely high as the gas barrier film when the water-repellent layer is formed on the surface.

Further, at this time, the silicon oxide film is preferably formed so as to have a refractive index of 1.45 to 1.48. This is because the gas barrier film provided with the silicon oxide film having such characteristics can exhibit very excellent gas barrier characteristics.

When intending to allow each element compositional ratio of Si, O and C to be 170 to 200 O atoms and 30 or less C atoms to 100 Si atoms, the flow ratio of oxygen gas to organic silicon compound gas, the magnitude of input power per unit flow of the organic silicon compound gas and the like are regulated, whereby each element compositional ratio can be controlled in the above range. Particularly, it is preferable to control so as to limit the mingling of C. For example, the silicon oxide film is made to be a $SiO_2$-like film to limit the mingling of C by regulating the flow ratio of (oxygen gas/organic silicon compound gas) in a range of about 3 to 50 and the input power per unit flow of the organic silicon compound gas is increased to make easy the disconnection of a Si—C bond, whereby the mingling of C into the film can be limited. It is to be noted that the upper limit of the flow ratio is defined for the sake of convenience and the flow ratio may exceed 50 without any particular problem.

The silicon oxide film having an element compositional ratio falling in this range is reduced in a Si—C bond. Therefore, the silicon oxide film becomes a $SiO_2$-like and uniform film and exhibits significantly excellent gas barrier characteristics. The device for measuring the element compositional ratio may be any device by which each component of Si, O and C can be measured quantitatively. Typical measuring devices include those utilizing ESCA (Electron spectroscopy for chemical analysis), RBS (Rutherford back scattering) and Auger electron spectroscopy. Each element compositional ratio is evaluated from the results measured using these devices.

The case where the element compositional ratio of O is less than 170 is seen very often when the flow ratio of (oxygen gas/organic silicon compound gas) is small (the flow rate of oxygen gas is relatively small) and when the input power per unit flow of the organic silicon compound gas is small, with the result that the element compositional ratio of C increases. As a consequence, many Si—C bonds exist in the film, so that the film is far from a $SiO_2$-like and uniform film, leading to an increase in oxygen transmission rate and water vapor transmission rate and the resulting film can therefore exhibit insufficient gas barrier characteristics. Incidentally, the number of O atoms scarcely exceeds 200 stoichiometrically. The case where the element compositional ratio of C exceeds 30 is seen very often in the same condition as in the case where the element compositional ratio of O is less than 170, namely, when the flow ratio of (oxygen gas/organic silicon compound gas) is small (the flow rate of oxygen gas is relatively small) and when the input power per unit flow of the organic silicon compound gas is small, with the result that Si—C bonds are left in the film as it is, so that the film is far from a $SiO_2$-like and uniform film, leading to an increase in oxygen transmission rate and water vapor transmission rate and the resulting film can therefore exhibit insufficient gas barrier characteristics. In the meantime, although the lower limit of the element compositional ratio of C is not particularly defined, it may be set to 10 as the lower limit in actual depositing processes. Although as a matter of fact, it is not easy to make the element compositional ratio of C less than 10, the element compositional ratio of C may be less than 10 and a $SiO_2$-like and uniform film is obtained.

When intending to obtain absorption based on Si—O—Si stretching vibration between 1055 and 1065 $cm^{-1}$ in IR measurement, the flow ratio of oxygen gas to organic silicon compound gas and the magnitude of the input power per unit flow of the organic silicon compound gas are regulated such that the silicon oxide film is made to be a $SiO_2$-like and uniform film available, whereby the absorption wavelength can be controlled in the above range. For example, the silicon oxide film is made to be a $SiO_2$-like film by regulating the flow ratio of (oxygen gas/organic silicon compound gas) in a range of about 3 to 50 and by increasing input power per unit flow of the organic silicon compound gas to make easy the disconnection of a Si—C bond. Incidentally, the upper limit of the flow ratio is defined for the sake of convenience and may exceed 50 without any particular problem. The silicon oxide film showing IR absorption like this has a Si—O bond peculiar to a $SiO_2$-like and uniform film and therefore exhibits significantly superior gas barrier characteristics.

The evaluation of the IR absorption is made by measuring using an infrared spectrophotometer for IR measurement. It is preferable to set an ATR (multiple reflections) measuring device to the infrared spectrophotometer to measure infrared absorption spectrum. At this time, it is preferable to measure at an incident angle of 45 degrees by using a germanium crystal as the prism.

The case where no IR absorption is observed is seen very often when the flow ratio of (oxygen gas/organic silicon compound gas) is small (the flow rate of oxygen gas is relatively small) and when the input power per unit flow of the organic silicon compound gas is small, with the result that the element compositional ratio of C increases. As a consequence, Si—C bonds exist in the film, so that Si—O bonds peculiar to a SiO$_2$-like and uniform film are relatively decreased and no IR absorption is therefore observed in the above wavelength range. The silicon oxide film obtained in this manner is increased in oxygen transmission rate and water vapor transmission rate and the resulting film can therefore exhibit insufficient gas barrier characteristics.

When intending to make the silicon oxide film have a refractive index of 1.45 to 1.48, the flow ratio of oxygen gas to organic silicon compound gas and the magnitude of the input power per unit flow of the organic silicon compound gas are regulated, whereby the refractive index can be controlled in the above range. For example, it can be controlled by regulating the flow ratio of (oxygen gas/organic silicon compound gas) in a range of about 3 to 50. Incidentally, the upper limit of the flow ratio is defined for the sake of convenience and may exceed 50 without any particular problem. The silicon oxide film having a refractive index falling in the above range is a close and SiO$_2$-like film reduced in impurities and therefore exhibits significantly superior gas barrier characteristics. The evaluation of the refractive index is made by measuring the transmission rate and reflectance by an optical spectroscope to find a refractive index at 633 nm by using an optical interference method.

The case where the refractive index is less than 1.45 is seen very often when the flow ratio of (oxygen gas/organic silicon compound gas) is out of the above range and when the input power per unit flow of the organic silicon compound gas is small, so that a low density and sparse silicon oxide film is obtained, with the result that the formed silicon oxide film is sparse and is increased in oxygen transmission rate and water vapor transmission rate and the resulting film can therefore exhibit insufficient gas barrier characteristics. On the other hand, the case where the refractive index exceeds 1.48 is seen very often when the flow ratio of oxygen gas to organic silicon compound gas is out of the above range and when impurities such as C (carbon) is mingled, with the result that the formed silicon oxide film is sparse and is increased in oxygen transmission rate and water vapor transmission rate and the resulting film can therefore exhibit insufficient gas barrier characteristics.

A gas barrier film obtained by forming the silicon oxide film having the aforementioned each characteristic in a thickness as low as 5 to 300 nm can exhibit excellent gas barrier characteristics and the silicon oxide film is scarcely cracked. When the thickness of the silicon oxide film is less than 5 nm, there is the case where the silicon oxide film cannot cover the entire surface of the substrate and therefore the gas barrier characteristics cannot be improved. On the other hand, when the thickness of the silicon oxide film exceeds 300 nm, this tends to bring about such disadvantages that the silicon oxide film is easily cracked, the transparency and outward appearance are lowered, the curling of the film is increased and further the film is mass-produced with difficulty, increasing manufacturing costs.

Also, when the gas barrier film in the present invention is used in applications, such as packaging materials, of which flexibility is demanded, the thickness thereof is more preferably designed to be 5 to 30 nm in consideration of the mechanical characteristics and use of the silicon oxide film to be formed. If the thickness of the silicon oxide film is designed to be 5 to 30 nm, the silicon oxide film is made to have the flexibility required for soft packaging materials and the generation of cracks when the film is bent can be prevented. Also, in the case where the gas barrier film of the present invention is used in applications for which a relatively lower thickness is not required, for example, in applications such as gas barrier films for film liquid crystal displays, film organic light emitting diode (OLED) displays and film solar cells, the gas barrier characteristics are needed preferentially and therefore the thickness of the gas barrier film is preferably higher than the above range, namely, from 5 to 30 nm and more preferably 30 to 200 nm in the case of also considering productivity.

The use of the gas barrier film of the present invention in the above applications enables the formation of a film having a thickness lower than that of current products having the same level of gas barrier characteristics.

The silicon oxide film used for the above gas barrier layer is preferably formed by a CVD deposition as mentioned above, but it is formed particularly preferably by a plasma CVD deposition.

The plasma CVD deposition is a method in which raw material gas having a fixed pressure is put in a plasma state by discharging to promote a chemical reaction on the surface of a substrate by active particles generated in the plasma thereby forming the film. This plasma CVD deposition has such an advantage that a desired material can be formed as a film at lower temperatures (range from about −10 to 200° C.) on the order giving no thermal damages to a high molecular resin and the type and qualities of film can be controlled by selecting the type and flow rate of raw material gas, depositing pressure and input power.

The above silicon oxide film is formed as follows. Specifically, mixed gas of organic silicon compound gas and oxygen gas is fed at a given flow rate to the inside of a reaction chamber of a plasma CVD deposition apparatus and also d.c. power or power having a fixed frequency ranging from low frequencies to high frequencies is applied to generate a plasma, in which the organic silicon compound gas is reacted with gas having an oxygen atom, particularly, oxygen gas, whereby the silicon oxide film is formed on the substrate. No particular limitation is imposed on the type of plasma CVD deposition apparatus and various types of plasma CVD deposition apparatus may be used. In general, an apparatus capable of continuously forming a film is preferably used, the apparatus being able to form a silicon oxide film continuously by using a lengthy high molecular resin film as a substrate and by conveying the resin film at the same time.

In the present invention, although the silicon oxide film is preferably transparent, layers inferior in transparency among the substrate and other laminate materials are optionally laminated without any restriction to serve the silicon oxide film in various applications. The transparency and its level differ in various applications. For example, in the case of using the gas barrier film using the silicon oxide film according the present invention as packaging materials, the provision of shading ability which is made by printing using color ink or the like is admitted to protect the content from rays. Other than the above, it is possible to laminate layers in which additives, such as antistatic agents and fillers, which impair the transparency of the whole gas barrier film are kneaded and mixed or to laminate metal foils or the like having no transparency. However, because the transparency of a whole gas barrier film is required in the case where the gas barrier film is used as substrates in applications such as gas barrier films for film liquid crystal displays, film organic light emitting diode (OLED) displays or film solar cells, the transparency of the silicon oxide film in the present invention has a large effect.

C. Substrate

Next, the substrate constituting the gas barrier film of the present invention will be explained.

There is no particular limitation to the substrate used in the gas barrier film of the present invention and any film may be used as far as it is a film capable of supporting the aforementioned vacuum deposition film having barrier characteristics.

Specific examples of these films which may be used are as follows.

Polyolefin (PO) resins such as homopolymers or copolymers of ethylene, polypropylene, butene and the like.

Amorphous polyolefin resins (APO) such as cyclic polyolefins.

Polyester type resins such as polyethylene terephthalate (PET) and polyethylene 2,6-naphthalate (PEN).

Polyamide type (PA) resins such as nylon 6, nylon 12 and copolymer nylon and polyvinyl alcohol type resins such as polyvinyl alcohol (PVA) resins and ethylene/vinyl alcohol copolymers (EVOH).

Polyimide (PI) resins.

Polyether imide (PEI) resins.

Polysulfone (PS) resins.

Polyether sulfone (PES) resins.

Polyether ether ketone (PEEK) resins.

Polycarbonate (PC) resins.

Polyvinyl butyrate (PVB) resins.

Polyarylate (PAR) resins.

Fluorine type resins such as ethylene-tetrafluoroethylene copolymers (ETFE), ethylene trifluorochloride (PFA), ethylene tetrafluoride-perfluoroalkyl vinyl ether copolymers (FEP), vinylidene fluoride (PVDF), vinyl fluoride (PVF), and perfluoroethylene-perfluoropropylene-perfluorovinyl ether copolymers (EPA).

Also, besides the foregoing resins, photocurable resins such as resin compositions comprising an acrylate compound having a radical reactive unsaturated compound, resin compositions comprising the aforementioned acrylate compound and a mercapto compound having a thiol group and resin compositions obtained by dissolving oligomers such as epoxyacrylate, urethaneacrylate, polyesteracrylate, or polyether acrylate in a polyfunctional acrylate monomer or mixtures of these resins may be used. Moreover, laminates obtained by laminating one or two or more of these resins by means of laminating or coating may be used.

The substrate using the resins exemplified above according to the present invention may be either a non-oriented film or an oriented film.

The substrate according to the present invention may be produced using a conventionally known usual method. For example, a resin as the raw material is melted using an extruder, extruded using a cyclic die or T-die and cooled quickly, whereby a non-oriented substrate which is substantially amorphous and non-oriented can be produced. Also, a non-oriented substrate is oriented in the direction of the flow (vertical axis) of the substrate or in the direction perpendicular (horizontal axis) to the direction of the flow of the substrate by using a known method such as uniaxial orientation, tenter-type sequential biaxial orientation, tenter-type simultaneous biaxial orientation or tubular-type simultaneous biaxial orientation, whereby an oriented substrate can be produced. The magnification of orienting in this case is preferably 2 to 10 in both of the vertical axis direction and the horizontal axis direction though it may be selected arbitrarily so as to match with a resin as the raw material of the substrate.

Also, the substrate according to the present invention may be processed by surface treatment such as corona treatment, flame treatment, plasma treatment, glow discharge treatment, surface roughing treatment, or chemical treatment.

Further, an anchor coating-agent layer may be formed on the surface of the substrate according to the present invention with the intention to improve adhesion to the vacuum deposition film. As the anchor coating agent to be used in the anchor coating-agent layer, a polyester resin, isocyanate resin, urethane resin, acryl resin, ethylenevinyl alcohol resin, vinyl modified resin, epoxy resin, modified styrene resin, modified silicon resin, and alkyl titanate may be used either singly or in combinations of two or more. Conventionally known additives may be added to these anchor coating agents. The substrate may be coated with the above anchor coating agent by using a known method such as roll coating, gravure coating, knife coating, dip coating, or spray coating and the solvents or diluents are removed by drying, whereby anchor coating can be carried out. The amount of the above anchor coating agent to be applied is preferably about 0.1 to 5 $g/m^2$ (dry condition).

As the substrate, a lengthy product wound roll-like is convenient. The thickness of the substrate is preferably 3 to 188 μm in the case of using it as a substrate for general wrapping materials or packaging materials though it cannot be defined as a whole because it differs depending on uses of the resulting gas barrier film.

D. Manufacturing Method

The gas barrier film of the present invention comprises, as aforementioned, a substrate, a gas barrier layer comprising a vacuum deposition layer formed on the substrate, and a water-repellent layer formed on the gas barrier layer. As required, a water-repellent layer may be formed between the substrate and the gas barrier layer. In the present invention, the above gas barrier layer and the water-repellent layer may be both formed by a plasma CVD deposition as aforementioned.

First, as to preferable depositing conditions in the plasma CVD deposition when forming the gas barrier layer, the temperature of the substrate during deposition is in a range from −20 to 100° C. and preferably in a range from −10 to 30° C.

Next, using organic silicon compound gas and gas containing an oxygen atom as raw material gas, the flow ratio of this organic silicon compound gas to the gas containing an oxygen atom is designed to fall in a range from 3 to 50 and preferably in a range from 3 to 10 when the flow of the organic silicon compound gas is 1.

A higher effect is obtained by setting a large input power per unit area in a plasma generating device of a plasma CVD deposition apparatus and by forming a space for the confinement of plasma by using a magnet to thereby promote the reactivity.

Also, in the present invention, as the organic silicon compound gas among the above raw material gases, hexamethyldisiloxane (HMDSO), 1,1,3,3-tetramethyldisiloxane (TMDSO), tetramethylsilane (TMS), vinyltrimethoxysilane, vinyltrimethylsilane, tetramethoxysilane (TMOS), methyltrimethoxysilane, dimethyldimethoxysilane, trimethylmethoxysilane, tetraethoxysilane (TEOS), dimethyldiethoxysilane, methyldimethoxysilane, methyldiethoxysilane, and hexamethylsilazane may be preferably used. Besides the above compounds, conventionally known compounds such as tetramethyldisiloxane and normal methyltrimethoxysilane may be used either singly or in combinations of two or more.

In the present invention, however, particularly an organic silicon compound having no carbon-silicon bond in its molecule is preferably used in order to form the $SiO_2$-like film. Specific examples of the organic silicon compound may include tetramethoxysilane (TMOS), methyltrimethoxysilane, methyldimethoxysilane, tetraethoxysilane (TEOS), methyltriethoxysilane, dimethyldiethoxysilane, methyldimethoxysilane, and methyldiethoxysilane. Among these compounds, it is preferable to use tetramethoxysilane (TMOS) and tetraethoxysilane (TEOS) in which no carbon-silicon bond exists in its molecule.

Also, examples of the gas containing an oxygen atom may include $N_2O$, oxygen, CO, and $CO_2$. Among these compounds, oxygen gas is preferably used.

The reason why a gas barrier film having better gas barrier characteristics is obtained by using an organic compound having no carbon-silicon bond as the organic silicon compound gas among the raw material gases and by controlling the temperature of the substrate at the start of the operation, the flow ratio of the raw materials and further input power in the plasma generation device in the above ranges is considered to be that the organic silicon compound gas is made highly decomposable and the oxygen atom is easily incorporated into the film with the result that a $SiO_2$-like film is formed.

Next, as to preferable film-forming conditions in the plasma CVD deposition (plasma polymerization method) when forming the water-repellent layer, the temperature of the substrate during deposition is in a range from −20 to 100° C. and preferably in a range from −10 to 30° C.

Next, using any one of organic silicon compound gas, hydrocarbon gas, and carbide fluoride gas as raw material gas, input power per unit area in a plasma generation device of a plasma CVD deposition apparatus is set to a magnitude enabling the formation of an organic thin film, the pressure for forming a film is designed to fall in a high pressure range (50 to 300 mTorr) on the order ensuring no generation of particles and a space for the confinement of a plasma is formed by using a magnet to thereby promote the reactivity, thereby producing a higher effect.

Also, using the above raw material gases, a film having high water-repellency can be formed by using any one of the following methods in the present invention.

① A method in which a methyl group-rich thin film is formed.

② A method in which a hydrocarbon film constituted only of C and H is formed.

③ A method in which a thin film containing fluorine is formed.

The raw material gases to be used in these methods will be explained hereinbelow.

① In the Case of Forming a Methyl-rich Organic Film

As the organic silicon compound gas, hexamethyldisiloxane (HMDSO), 1,1,3,3-tetramethyldisiloxane (TMDSO), tetramethylsilane (TMS), vinyltrimethoxysilane, vinyltriethylsilane, tetramethoxysilane (TMOS), methyltrimethoxysilane, dimethyldimethoxysilane, trimethylmethoxysilane, tetraethoxysilane (TEOS), dimethyldiethoxysilane, methyldimethoxysilane, methyldiethoxysilane, or hexamethylsilazane is preferably used. Besides the above compounds, conventionally known compounds such as tetramethyldisiloxane and normal methyltrimethoxysilane may be used either singly or in combinations of two or more.

However, in this case, particularly an organic silicon compound having many carbon-silicon bonds in its molecule is preferably used for the purpose of forming a methyl-rich film. Specific examples of the organic silicon compound may include hexamethyldisiloxane (HMDSO), 1,1,3,3-tetramethyldisiloxane (TMDSO), tetramethylsilane (TMS), vinyltrimethoxysilane, vinyltrimethylsilane, methyltrimethoxysilane, dimethyldimethoxysilane, trimethylmethoxysilane, dimethyldiethoxysilane, methyldimethoxysilane, methyldiethoxysilane, or hexamethylsilazane. Among these compounds, hexamethyldisiloxane (HMDSO; $(CH_3)_3SiOSi(CH_3)_3$), 1,1,3,3-tetramethyldisiloxane (TMDSO; $(CH_3)_2HSiOSiH(CH_3)_2$), and tetramethylsilane (TMS; $Si(CH_3)_4$) comprising more carbon-silicon bonds in a molecule are preferable.

② In the Case of a Hydrocarbon Material

Preferable examples of materials as the hydrocarbon type material may include $CH_4$, $C_2H_2$, $C_2H_4$, and $C_3H_8$, and $C_2H_2$ and $C_2H_4$ may be given as particularly preferable examples.

③ In the Case of a Fluorine-containing Organic Material

Examples of the fluorine-containing organic material include $CF_4$, $C_2F_4$, $C_2F_6$, $C_3F_6$, $C_3F_8$, and $C_5F_8$, Particularly, $C_2F_4$, and $C_3F_8$ are preferable.

The reason why a more superior water-repellent film is obtained by using an organic compound comprising many carbon-silicon bonds as the organic silicon compound gas among the raw material gases and by controlling the temperature of the substrate at the start of the operation, the flow ratio of the raw materials and further input power in the plasma generation device and depositing pressure in the above ranges is considered to be that the organic silicon compound gas is less decomposable and the methyl group and fluorine are easily incorporated into the film (in the case of the above methods ① and ③ or that the film is formed only of CH bonds with the result that a film with a high water-repellency (in the case of the above method ②) is formed.

E. Gas Barrier Film

The gas barrier film of the present invention may be those obtained by laminating the above gas barrier layer and water-repellent layer plurally in this order on the substrate FIG. 2 shows a gas barrier layer 1 formed by laminating a gas barrier layer 3 and a water-repellent layer 4 on a substrate 2 in this order to form four layers each. It is possible to more improve the gas barrier characteristics by laminating the gas barrier layer and the water-repellent layer plurally in this manner.

In the present invention, the numbers of the gas barrier layers and water-repellent layers to be laminated are preferably 2 or more and 20 or less, and particularly preferably 2 or more and 10 or less respectively from the viewpoint of gas barrier characteristics and manufacturing efficiency.

The gas barrier film of the present invention exhibits such very excellent gas barrier characteristics that the oxygen transmission rate is 0.5 $cc/m^2/day \cdot atm$ or less and the water-vapor transmission rate is 0.5 $g/m^2/day$ or less and more preferably the oxygen transmission rate is 0.1 $cc/m^2/day \cdot atm$ or less and the water-vapor transmission rate is 0.1 $g/m^2/day$ or less. Since the gas barrier film of the present invention does not almost transmit oxygen and water vapor which are causes of deterioration in the qualities of the content, it is preferably used in the applications, for example, wrapping materials for foods, medicinal supplies and the like, and packaging materials or substrates for electronic devices and the like for which high gas barrier characteristics are required. Also, because the gas barrier film of the present invention has both high gas barrier characteristics and shock resistance, it may be used as, for example, base materials for various displays. It may also be used for cover films of solar cells and the like.

F. Laminate Material

The gas barrier film can be developed in various applications such as those aforementioned by further laminating other layers on the aforementioned gas barrier film to form a laminate. As the above other layers to be laminated here, various layers may be used corresponding to the uses to be intended and there is no particular limitation to these other layers. As to laminates which can make use of the characteristics of the aforementioned gas barrier film in an efficient manner, the following explanations are concerned with a first embodiment in which a heat sealing resin layer is laminated on the above gas barrier film and a second embodiment in which a conductive layer is laminated on the gas barrier film.

1. First Embodiment (Laminate Material)

FIG. 3 is a schematic sectional view showing the first embodiment of the present invention. In FIG. 3, a laminate material 11 comprises the gas barrier film 1 which is provided with the gas barrier layer 3 on one surface of the substrate 2 and further the water-repellent layer 4 on the surface of the gas barrier layer 3 and a heat sealing resin layer 13 on the water-repellent layer 4 of the gas barrier film 1 through an anchor coating agent layer and/or adhesive layer 12.

The anchor coating agent layer 12 constituting the laminate material 11 may be formed using, for example, an organic titanium type anchor coating agent such as alkyl titanate, isocyanate type anchor coating agent, polyethyleneimine type anchor coating agent, or polybutadiene type anchor coating agent. The formation of the anchor coating agent layer 12 may be accomplished by coating with an anchor coating agent as aforementioned by using a known coating method such as roll coating, gravure coating, knife coating, dip coating, or spray coating, followed by drying to remove solvents and diluents. The amount of the above anchor coating agent to be applied is preferably about 0.1 to 5 g/m$^2$ (dry condition).

Also, the adhesive layer 12 constituting the laminate material 11 may be formed using various laminating adhesives such as a solvent type, aqueous type, non-solvent type, or heat-melt type containing, as its major component, a vehicle such as a polyurethane type, polyester type, polyamide type, epoxy type, poly(meth)acryl type, polyvinyl acetate type, polyolefin type, casein, wax, ethylene-(meth) acrylic acid copolymer, or polybutadiene type. The formation of the adhesive layer 12 may be accomplished by coating with a laminating adhesive as aforementioned by using a coating method such as roll coating, gravure coating, knife coating, dip coating, spray coating, or other coating methods, followed by drying to remove solvents and diluents. The amount of the above laminating adhesive to be applied is preferably about 0.1 to 5 g/m$^2$ (dry condition).

As materials for the heat sealing resin used in the heat sealing resin layer 13 constituting the laminate material 11, resins which can be melted by heat and fused mutually with a counter material by heat may be exemplified. Specific examples which may be used as the resin include low-density polyethylene, middle-density polyethylene, high-density polyethylene, straight-chain (linear) low-density polyethylene, polypropylene, or acid modified polyolefin resins, polyvinyl acetate type resins, poly(meth) acryl type resins, and polyvinyl chloride type resins obtained by modifying a polyolefin type resin such as ethylene/vinyl acetate copolymers, ionomer resins, ethylene/acrylic acid copolymers, ethylene/methacrylic acid copolymers, ethylene/methylmethacrylate copolymers, ethylene/propylene copolymers, polybutene polymers, methylpentene polymer, polybutene polymer, polyethylene, or polypropylene with an unsaturated carboxylic acid such as acrylic acid, methacrylic acid, maleic acid, maleic acid anhydride, fumaric acid, or itaconic acid. The heat sealing resin layer 13 may be formed by applying a heat sealing resin as aforementioned or by laminating a film or sheet comprising of a heat sealing resin as aforementioned. The thickness of the heat sealing resin layer 13 as aforementioned may be designed to be in a range from 5 to 300 μm and preferably 10 to 100 μW.

FIG. 4 is a schematic sectional view showing another example of the laminate material in this embodiment. In FIG. 4, a laminate material 21 comprises a gas barrier film 1 which is provided with a gas barrier layer 3 on one surface of a substrate 2 and further a water-repellent layer 4 on the surface of the gas barrier layer 3, a heat sealing resin layer 23 on the water-repellent layer 4 of the gas barrier film 1 through an anchor coating agent layer and/or adhesive layer 22 and a base material layer 24 formed on the other surface (gas barrier film-unformed surface).

The anchor coating agent layer or adhesive layer 22 and heat sealing resin layer 23 constituting the laminate material 21 may be made in the same manner as in the case of the anchor coating agent layer, adhesive layer 12 and heat sealing resin layer 13 constituting the aforementioned laminate material 11 and explanations of these layers are omitted here.

As the substrate layer 24 constituting the laminate material 21, a film or sheet of a resin having superior mechanical, physical, chemical, and other qualities and possessing particularly, high strength, toughness and also heat resistance may be used because the substrate layer 24 is base raw material in the case where for example, the laminate material 21 constitutes packaging containers. Examples of the substrate layer 24 include oriented (uniaxial or biaxial) or non-oriented films or sheets of tough resins such as polyester type resins, polyamide type resins, polyalamide type resins, polyolefin type resins, polycarbonate type resins, polystyrene type resins, polyacetal type resins, and fluorine type resins. The thickness of this base material layer 24 is desirably about 5 to 100 μm and preferably about 10 to 50 μm.

Also, in this embodiment, the base material layer 24 may be provided with a front-side print or backside print formed by printing a desired print pattern such as characters, figures, symbols, designs, or patterns by a usual printing method. Such characters and the like can be well observed visually through this gas barrier film 1 since the gas barrier film 1 constituting the laminate material 21 has high transparency.

Moreover, in this embodiment, as the substrate layer 24, for example, various paper substrates constituting a paper layer may be used. Concretely, paper substrates made to have formative characteristics, bending resistance and rigidity, for example, bleached or unbleached paper substrates having strong sizing characteristics or pure-white machine glazed paper, kraft paper, paperboard, or converted paper may be used. As such paper base materials, those having a basis weight of about 80 to 600 g/m$^2$ and preferably about 100 to 450 g/m$^2$ are preferably used.

Also, in this embodiment, a combination of the aforementioned resin film or sheet and the aforementioned paper substrate may be used for the substrate layer 24.

FIG. 5 is a schematic sectional view showing a still another example of the laminate material of this embodiment. In FIG. 5, a laminate material 31 comprises a gas barrier film 1 which is provided with a gas barrier layer 3 on one surface of a substrate 2 and further a water-repellent layer 4 on the surface of the gas barrier layer 3, a heat sealing resin layer 33 on the water-repellent layer 4 of the gas barrier film 1 through an anchor coating agent layer and/or adhesive layer 32, a base material layer 34 formed on the other surface (gas barrier film-unformed surface), and a heat sealing resin layer 35 formed on this substrate layer 34.

The anchor coating agent layer, adhesive layer 32, and the heat sealing resin layers 33 and 35 may be made in the same manner as in the case of the anchor coating agent layer, adhesive layer 12, and the heat sealing resin layer 13 constituting the aforementioned laminate material 11 and also, the substrate layer 34 constituting the laminate material 31 may be made in the same manner as in the case of the substrate layer 24 constituting the above laminate material 21. Therefore, explanations of these layers are omitted here.

As the laminate material in this embodiment, films or sheets of resins, which function as a barrier against, for example water vapor and water, such as low-density polyethylene, middle-density polyethylene, high-density polyethylene, straight-chain low-density polyethylene, polypropylene and ethylene/propylene copolymers, films or sheets of resins, which function as a barrier against, for example oxygen and water vapor, such as polyvinylidene chloride, polyvinyl alcohol and saponified materials of ethylene/vinyl acetate copolymers or films or sheets various coloring resins having shading characteristics and produced by adding colorants such as pigments and in addition, desired additives to a resin and kneading the mixture to form a film may be used.

These materials may be used either singly or in combinations of two or more. Although the thickness is optional, it is generally about 5 to 300 μm and preferably about 10 to 100 μm.

When the laminate material of this embodiment is used in packaging container applications, the packaging container is usually placed in physically and chemically severe conditions and the packaging adaptability is therefore required for the laminate material. To state more specifically, various requirements such as deformation preventive strength, strength against drop impact, pinhole resistance, heat resistance, sealing ability, quality preserving ability, operability, sanitary characteristics, etc., are needed. For this, in the laminate material of this embodiment, materials meeting various requirements as mentioned above are optionally selected and may be used as the substrate 2, the substrate layers 24 and 34 or other structural materials. As the laminate material, those selected from films and sheets of the following known resins may be used. Specific examples of these resins include low-density polyethylene, middle-density polyethylene, high-density polyethylene, linear low-density polyethylene, polypropylene, ethylene/propylene copolymers, ethylene/vinyl acetate copolymers, ionomer resins, ethylene/ethylacrylate copolymers, ethylene/acrylic acid or methacrylic acid copolymers, methylpentene polymers, polybutene type resins, polyvinyl chloride type resins, polyvinyl acetate type resins, polyvinylidene chloride type resins, vinyl chloride/vinylidene chloride copolymers, poly (meth) acryl type resins, polyacrylnitrile type resins, polystyrene type resins, acrylonitrile/styrene copolymers (AS type resins), acrylonitrile/butadiene/styrene copolymers (ABS type resins), polyester type resins, polyamide type resins, polycarbonate type resins, polyvinyl alcohol type resins, saponified products of ethylene/vinyl acetate copolymers, fluorine type resins, diene type resins, polyacetal type resins, polyurethane type resins and nitrocellulose. Besides the above films and sheets, for example, films such as cellophane and synthetic paper may also be used.

As the aforementioned film or sheet, any one of non-oriented types, types oriented in a uniaxial or biaxial direction and the like may be used. As its thickness, a thickness selected from several μm to about 300 μm is used though it is optional. No particular limitation is imposed on the position to be laminated. Also, in the present invention, the film or sheet may be any characteristic film such as an extruded film, inflation film and coating film.

The laminate materials such as the aforementioned laminate materials 11, 21, and 31 in this embodiment may be produced using a usual method of laminating packaging materials such as a wet lamination method, dry lamination method, non-solvent type dry lamination method, extrusion lamination method, T-die extrusion molding method, co-extrusion lamination method, inflation method, and co-extrusion inflation method.

It is to be noted that when performing the aforementioned lamination, the film may be processed by pretreatment such as corona treatment or ozone treatment according to the need. Also, an anchor coating agent such as an isocyanate type (urethane type), polyethyleneimine type, polybutadiene type, or organic titanium type and known adhesives such as laminate adhesives, e.g., a polyurethane type, polyacryl type, polyester type, epoxy type, polyvinyl acetate type, and cellulose type may be used.

(Packaging Container)

Next, a packaging container using the above laminate material will be explained. This packaging container is prepared using the laminate material of the aforementioned first embodiment and by subjecting the laminate material to bag-making or can-making using heat-fusion.

To state concretely, in the case where the packaging container is a soft package bag, the laminate material of the first embodiment is folded such that the heat sealing resin layer faces inside or two laminate materials according to the present invention are overlapped on each other and the peripheral end portions are thermally fused into a heat sealing form, for example, a side seal type, two-side seal type, three-side seal type, four-side seal type, envelope seal type, rafter seal type (pyroseal type), ribbed seal type, flat bottom seal type, and angular bottom seal type to form a seal portion, whereby packaging container having various forms according to the present invention can be produced.

In the foregoing explanations, the thermal fusion may be accomplished by a known method such as bar sealing, rotary roll sealing, belt sealing, impulse sealing, high-frequency sealing, and ultrasonic wave sealing.

FIG. 6 is a perspective view showing one example of a packaging container as aforementioned. In a packaging container 51 in FIG. 6, paired laminate materials 11 according to the present invention are overlapped on each other such that the heat sealing resin layer 13 faces inside and in this condition, three sides of the periphery are thermally fused to form a seal portion 52. This packaging container 51 allows the content to be filled in from an opening portion 53 formed on the remainder one side of the periphery. Then, after the content is filled, the above opening portion 53 is thermally fused to form a seal portion, whereby a packaging container in which the content is filled and packaged can be made.

The packaging container according to the present invention may be a self-standing package bag (standing pouch) or the like besides the above. Further, a tube container and the like may be produced using the laminate material according to the present invention.

Also, in the present invention, for example, a one-piece type, two-piece type or other in-out opening or a closing zipper may be optionally attached to the packaging container as aforementioned.

In the case where the packaging container of the present invention is a liquid filling paper container comprising a paper substrate, a blank plate for producing a desired paper container is produced using the laminate material prepared by laminating paper substrates according to the present invention. Using this blank plate, a body part, bottom part and head part are formed whereby, for example, a brick type, flat type, or Gebel top type liquid paper container and the like can be produced. Also, as to its shape, any one of a rectangular container or paper can having a cylinder form such as a circular type may be produced.

FIG. 7 is a perspective view showing one example of the aforementioned liquid filling paper container which is the packaging container of the present invention and FIG. 8 is a plan view of the blank plate used in the packaging container shown in FIG. 7. A blank plate 70 is produced by using, for example, the laminate material 31 of the present invention as shown in FIG. 5 and by punching so as to provide press lines m, m, . . . , for bending processing in the formation of a container, body panels 71, 72, 73 and 74 constituting a body part 62 of a container 61, top panels 71a, 72a, 73a and 74a constituting a top part 63 of the container 61, bottom panels 71b, 72b, 73b and 74b constituting a bottom part 64 of the container 61 and a thermal fusing panel 75 for forming a cylinder. This blank plate 70 is bent at the press lines m, m, . . . and the inside of the end of the body panel 71 and the outside of the thermal fusing panel 75 are thermally fused to form a cylinder. Thereafter, the bottom panels 71b, 72b, 73b and 74b are bent at the press lines m, m, . . . , followed by thermal fusion. After a liquid is filled in the cylinder from the opening of the top part, the top panels 71a, 72a, 73a and 74a are bent at the press lines m, m, . . . , followed by thermal fusion to thereby make the packaging container 61 in which the liquid is filled and packaged.

The packaging container of the present invention is used for filling and packaging various products such as various foods and drinks, chemicals such as adhesives and bonds, cosmetics, medicinal supplies, and miscellaneous goods such as a chemical body warmer.

2. Second Embodiment (Laminate Material)

The second embodiment of the present invention is a laminate material characterized by the structure in which a conductive layer is formed on at least one surface of the above gas barrier film. FIG. 9 shows one example of this embodiment. The laminate material of this embodiment is produced by forming a conductive layer 41 on a gas barrier film 1 comprising a substrate 2, a gas barrier layer (silicon oxide film) 3 formed on the substrate 2, and a water-repellent layer 4 formed on the gas barrier layer. As shown in FIG. 9, an anchor coating agent layer 42 for improving the adhesiveness of the gas barrier layer 3 as aforementioned may be formed between the gas barrier layer 3 and the substrate 2. Also, an overcoat layer 43 may be formed on the water-repellent layer 4.

The gas barrier film 1 is the same as the aforementioned gas barrier film and explanations concerning the gas barrier film 1 are omitted.

For example an ITO film is used as the conductive layer 41 used in this embodiment. The ITO film is formed by a sputtering deposition, PVD deposition, or ion plating deposition. In this embodiment, an ITO film obtained by a sputtering deposition among these depositions is desirable to obtain uniformity of the conductive surface.

This conductive layer 41 is formed generally in a film thickness ranging from 100 nm to 200 nm though the thickness is largely changed corresponding to the composition and use.

This conductive layer 41 preferably has such characteristics that the resistance is 0 to 50 $\Omega/\square$ and the overall light transmittance is 85% or more.

The conductive layer 41 as aforementioned may be used for a transparent electrode for driving a liquid crystal in the case of a liquid crystal display.

As the overcoat layer 43 to be used in the present invention, a ultraviolet-cured film of an epoxyacrylate prepolymer having a melting point of 50° C. or more or a urethaneacrylate prepolymer having a melting point of 50° C. or more may be used. A heatcurable type which is more thermally stable may be used if it can satisfy the requirements for use in the applications of display mediums such as liquid crystals. However, ultraviolet-curable resins having high productivity are more preferable. It is needless to say that adhesion to a polymer film and an inorganic layer is essential and it is also required for the resin to have flexibility and chemical resistance. A primer layer which has been usually adopted may be formed to attain this purpose.

(Image Display Medium)

The image display medium of the present invention obtains by using the laminate material shown by the above second embodiment as the substrate and by forming an image display layer on the above conductive layer.

Examples of such an image display device may include non-emission type displays, such as liquid crystal displays, which display with gradation by shuttering the brightness of a back light and self-emission type displays, such as plasma displays (PDP), field-emission displays (EED), and electroluminescence displays (EL), which are displayed by allowing a fluorescent material to shine using some energy.

When the above image display medium is a liquid crystal display, the foregoing image display layer represents a liquid crystal layer, whereas when the above image display medium is a self-emission type display, a fluorescent material layer having the fluorescent material corresponds to the above image display layer.

It is to be noted that the present invention is not limited to the above embodiments. The foregoing embodiments are examples and any one having substantially the same structure and action effect as those based on the technical concepts as described in the scope of the aspect of the patent of the present invention is embraced within the technical scope of the present invention.

EXAMPLES

The present invention will be explained in more detail by way of examples and comparative examples.

Examples 1 to 4

(Formation of a Gas Barrier Layer)

As shown in FIG. 10, a sheet-like (30 cm×21 cm) and biaxially oriented polyester film (E5101, manufactured by Toyobo Co., Ltd., thickness: 100 μm) was prepared as a substrate 20. This film was set to a lower electrode 114 in a chamber 102 of a plasma CVD deposition apparatus 101 such that the surface which was not processed by corona treatment faced upward (depositing surface side).

Next, the pressure in the chamber 102 of the CVD deposition apparatus 101 was reduced to an ultimate vacuum of $3.0 \times 10^{-5}$ Torr ($4.0 \times 10^{-3}$ Pa) by an oil-sealed rotary vacuum pump and a turbo-molecular pump.

Tetramethoxysilane (TMOS) gas (KBM-04, manufactured by Shin-Etsu Chemical Co., Ltd.), oxygen gas (manufactured by Taiyo Toyo Sanso Co., Ltd., purity: 99.9999% or more), and helium gas (manufactured by Taiyo Toyo Sanso Co., Ltd., purity: 99.999% or more) were prepared as materials.

Next, power (input power: 150 W) having a frequency of 90 kHz was applied to the lower electrode 114. 10 sccm of tetramethoxysilane, 10 sccm of oxygen, and 30 sccm of helium were introduced from a gas inlet port 109 disposed in the vicinity of the electrode in the chamber 102. The pressure in the depositing chamber was kept at 0.25 Torr by controlling the degree of opening of a valve 113 placed between a vacuum pump 108 and the chamber 102 to form a water-repellent layer 4 on a substrate film 3 with a barrier layer. Here, the aforementioned sccm is an abbreviation of standard cubic centimeter per minute. The film formation was continued until the film thickness was 50 nm to form a gas barrier layer on the substrate.

(Formation of a Water-repellent Layer)

The substrate formed with the gas barrier layer was set to the lower electrode in the chamber of the plasma CVD deposition apparatus 101 (FIG. 10). Next, the pressure in the chamber 102 of the CVD deposition apparatus 101 was reduced to an ultimate vacuum of $3.0 \times 10^{-5}$ Torr ($4.0 \times 10^{-3}$ Pa) by an oil-sealed rotary vacuum pump and a turbo-molecular pump.

The following materials were respectively prepared.
① HMDSO (hexamethyldisiloxane) gas, oxygen gas, and helium gas.
② HMDSO (hexamethyldisiloxane) gas and helium gas.
③ $C_2F_4$ (tetrafluoroethylene) gas.
④ $C_2H_2$ (acetylene) gas.

Next, power (input power: 150 W) having a frequency of 90 kHz was applied to the lower electrode 114. Then, 10 sccm of any one the gases of the aforementioned ① to ④ was introduced from a gas inlet port 109 disposed in the vicinity of the electrode in the chamber 102. The pressure in the depositing chamber was kept at 0.25 Torr by controlling the degree of opening of a valve 113 placed between a vacuum pump 108 and the chamber 102 to form a water-repellent layer on the substrate film formed with the barrier layer. Here, the aforementioned sccm is an abbreviation of standard cubic centimeter per minute. The film formation was continued until the film thickness was 5 nm to form gas barrier films of Examples 1 to 4.

Example 5

The same procedures as in the above Example 1 except that a polyethylene resin (mirason 11P, manufactured by Mitsui Chemicals) was melted at 350° C. as the temperature in a lip by using a resin extrusion coater and applied to form a coating layer as the water-repellent layer, thereby forming a gas barrier film of Example 5.

Example 6

The same procedures as in the above Example 1 except that a cyclic polyolefin resin (Zeonex, manufactured by Zeon Co., Ltd.) was dissolved in a concentration of 3 wt % in a cyclohexane solvent and applied using a coating bar, followed by drying at 80° C. for 30 minutes to form coating layer as the water-repellent layer, thereby forming a gas barrier film of Example 6.

Comparative Example 1

A gas barrier film was formed in the same manner as in Example 2 except that the flow rates of the HMDSO gas and the oxygen gas during the formation of the water-repellent layer were altered to those shown in Table 1.

Comparative Example 2

A gas barrier film was formed in the same manner as in Example 1 except that the water-repellent layer was not formed.

(Deposition)

1. Measurement of the Proportion of Components

The components of the silicon oxide film were measured by an ESCA (ESCA LAB220i-XL, manufactured by VG Scientific in England). A monochromatic Al X-ray source having a Ag-3d-5/2 peak intensity of 300 K to 1 Mcps as the X-ray source and a slit having a diameter of about 1 mm φ were used. Measurement was made in the condition that a detector was set on the normal line to the surface of the sample subjected to the measurement and the charge was properly calibrated. An analysis after the measurement was finished was made using a software Eclipse version 2.1 (manufacture by VG Scientific in England) annexed to the above ESCA apparatus and a peak corresponding to a binding energy of Si: 2p, C: 1s and O: 1s. At this time, the Shirley's background of each peak was removed to make the calibration of the coefficient of sensitivity (Si=0.817 and O=2.930 when C=1) of each element for peak areas, thereby finding the ratio of the numbers of atoms. As to the resulting ratios of the numbers of atoms, the number of Si atoms was set to 100 to calculate the numbers of O atoms and C atoms which were rated as the proportions of the O and C components.

2. IR Measurement

IR measurement was made using a Fourier transform type infrared spectrophotometer (Herschel FT/1R-610, manufactured by JASCO Co., Ltd.) equipped with an ATR (multiple reflections) measuring device (ATR-300/H, manufactured by JASCO Co., Ltd.). The infrared absorption spectrum was measured at an incident angle of 45 degrees by using a germanium crystal as the prism.

3. Measurement of Refractive Index

The refractive index of the silicon oxide film was measured using an optical spectroscope (UV-3100PC, manufactured by Shimadzu Corporation. The evaluation was made using a refractive index at 633 nm by using an optical interferometry from the obtained results of the measurements of the transmission rate and reflectance.

4. Gas Transmission Test

Oxygen gas transmission rate was measured using an oxygen transmission rate measuring device (OX-TRAN 2/20, manufactured by MOCON) at 23° C. in a dry condition (0% Rh). Water vapor transmission rate was measured using a water vapor transmission ratemeasuring device (PERMATRAN-W 3/31, manufactured by MOCON) in the condition of 37.8° C. and 100% Rh.

5. Measurement of Contact Angle with Water

The contact angle with water was measured and found by a method of measurement using a contact angle measuring device (Model CA-Z) manufactured by Kyowa Interface Science Co., LTD. Specifically, one droplet (fixed amount) of pure water was dripped on the surface of a subject to be measured and after a given period of time (10 seconds) passed, the shape of the water droplet was observed using a microscope or a CCD camera to find the contact angle physically.

(Result of Evaluation)

The results are listed in Table 1. In all of the examples, the film qualities of the gas barrier layer are as follows.

TABLE 1

| Si:O:C | 100:190:20 |
|---|---|
| Position of the Si—O—Si peak in IR measurement | 1060 cm$^{-1}$ |
| Refractive index | 1.48 |

| | Water-repellent layer | | | Gas barrier film | |
|---|---|---|---|---|---|
| | Raw material gas (materials in a wet system) | Flow rate (sccm) | O$_2$ gas flow rate (sccm) | Contact angle with water (°) | Water vapor transmission rate (g/m$^2$/day) | Oxygen transmission rate (cc/m$^2$/day) |
| Example 1 | HMDSO | 10 | — | 93 | 0.23 | |
| Example 2 | HMDSO | 10 | 100 | 62 | 0.42 | |
| Example 3 | C$_2$F$_4$ | 10 | 0 | 110 | 0.12 | |
| Example 4 | C$_2$H$_2$ | 10 | 0 | 65 | 0.41 | |
| Example 5 | Polyethylene resin | — | — | 60 | 0.45 | |
| Example 6 | Cyclic polyolefin resin | — | — | 72 | 0.33 | |
| Comparative Example 1 | HMDSO | 5 | 15 | 43 | 2.8 | |
| Comparative Example 2 | — | — | — | 21 (Gas barrier layer) | 3.0 | |

EFFECT OF THE INVENTION

As explained above, according to the present invention, the water-repellent layer having water-repellency is formed on the surface of the gas barrier layer and it is therefore possible to lower the adsorbent of the surface of the gas barrier layer to water and the like, whereby the gas barrier characteristics of the whole can be improved. Therefore, the gas barrier film of the present invention may be preferably used in applications for which very high gas barrier characteristics are required, for example, wrapping materials for foods, medicinal supplies and the like, and packaging materials or substrates for electronic devices.

Figure 1:
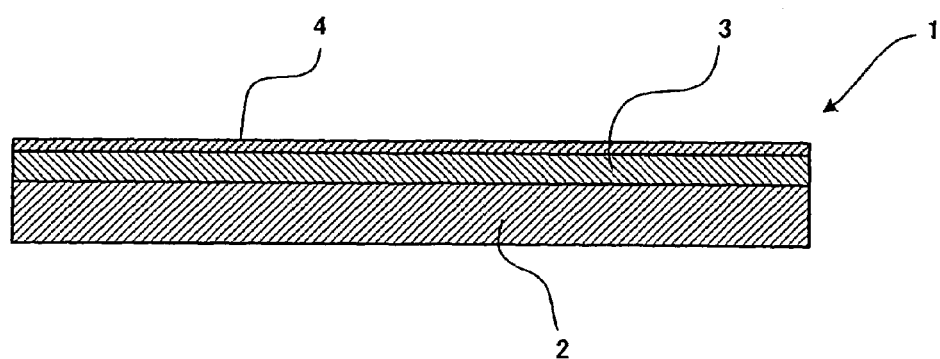
FIG. 1 is a schematic sectional view showing one example of the structure of a gas barrier film according to the present invention.
Figure 2:
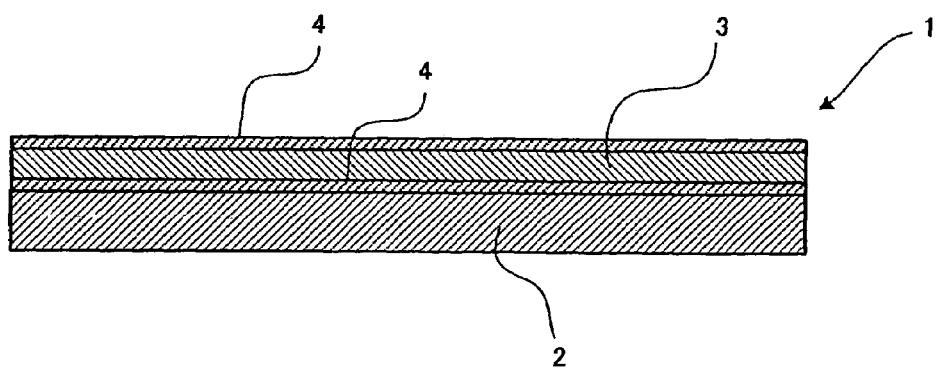
FIG. 2 is a schematic sectional view showing another example of a gas barrier film according to the present invention.
Figure 3:
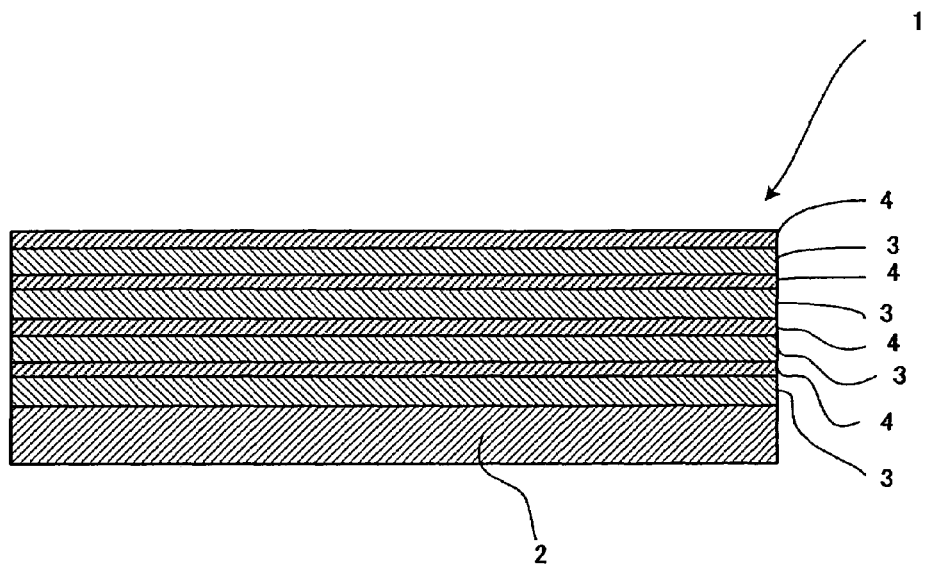
FIG. 3 is a schematic sectional view showing still another example of a gas barrier film according to the present invention.
Figure 4:
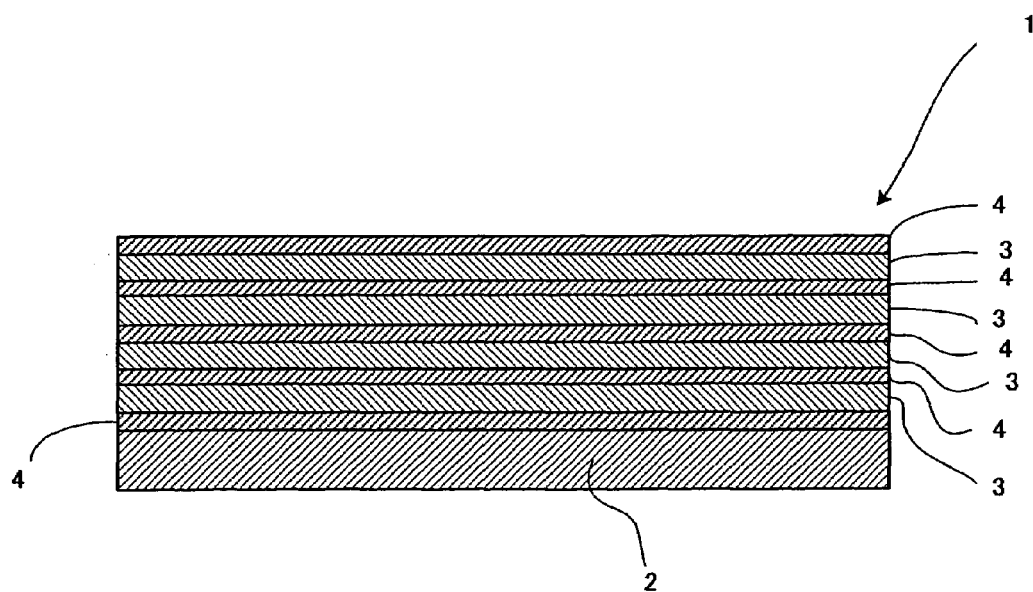
FIG. 4 is a schematic sectional view showing a further example of gas barrier film according to the present invention.
Figure 5:
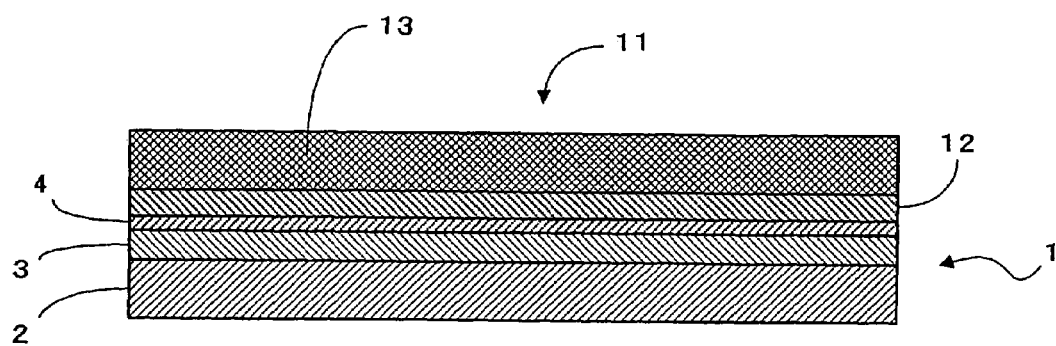
FIG. 5 is a schematic sectional view showing one example of a laminate material (first embodiment) using a gas barrier film according to the present invention.
Figure 6:
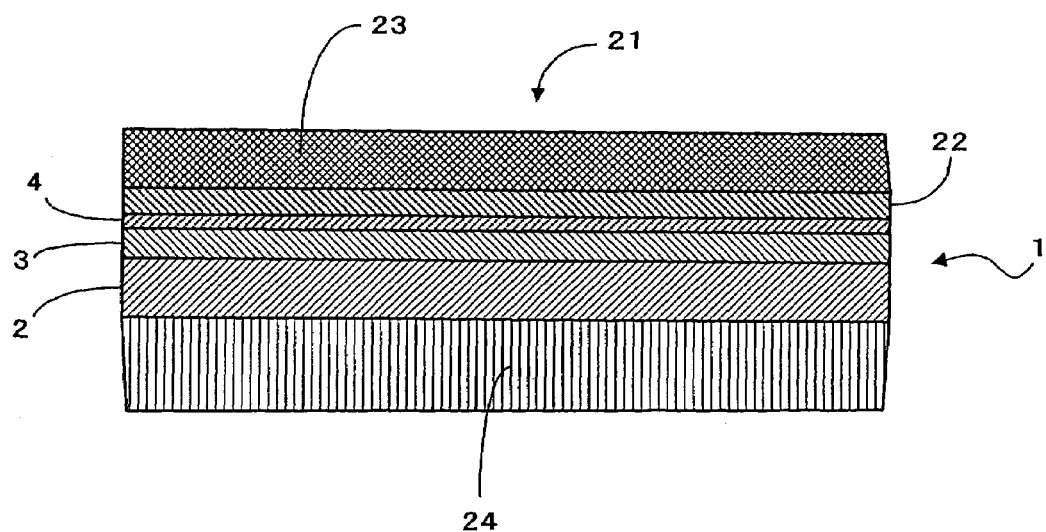
FIG. 6 is a schematic sectional view showing another example of a laminate material (first embodiment) using a gas barrier film according to the present invention.
Figure 7:
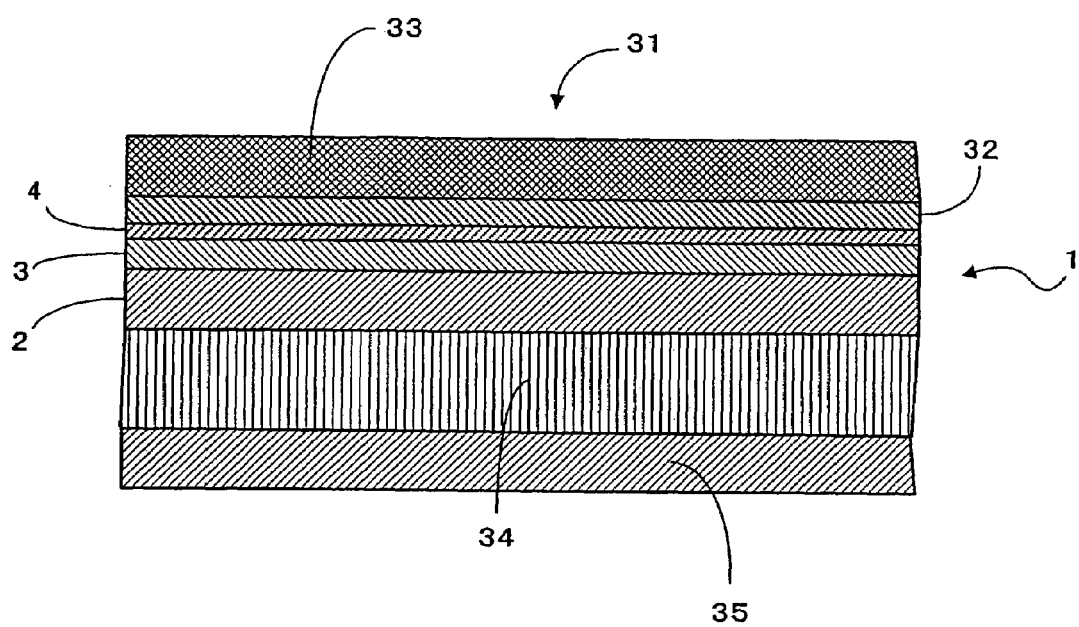
FIG. 7 is a schematic sectional view showing still another example of a laminate material (first embodiment) using a gas barrier film according to the present invention.
Figure 8:
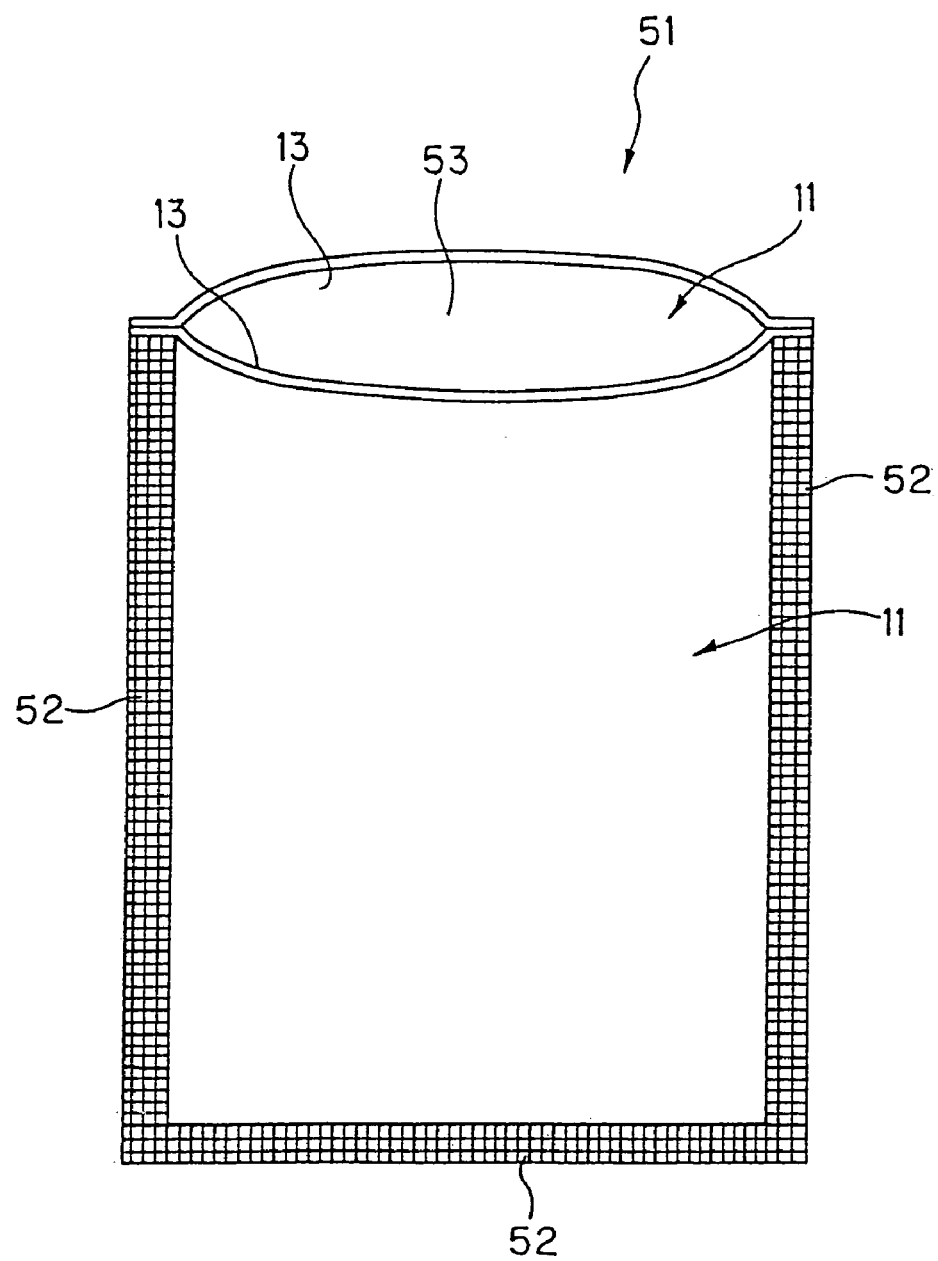
FIG. 8 is a schematic plan view showing one example of a packaging container using a gas barrier film according to the present invention.
Figure 9:
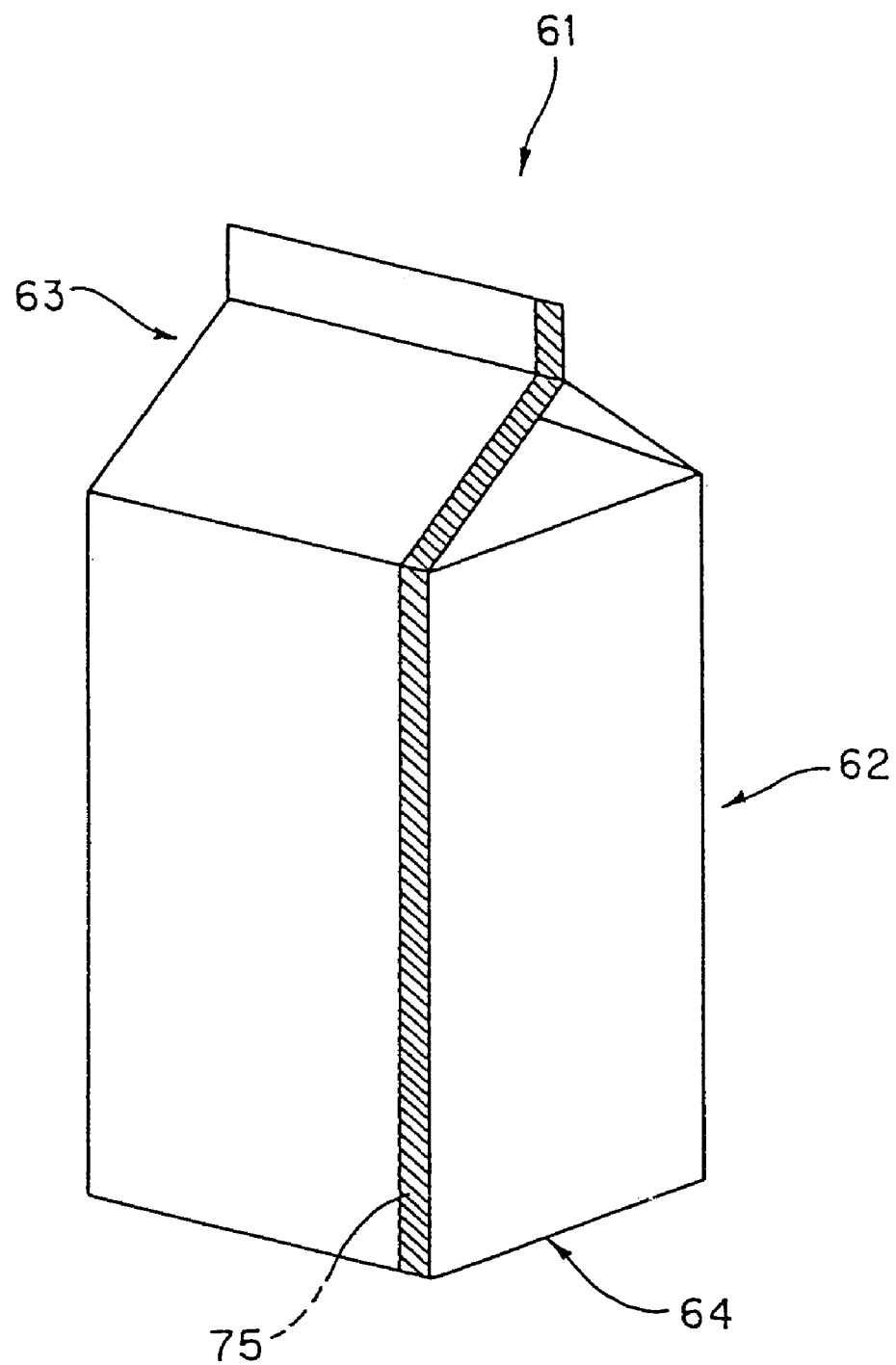

FIG. 9 is a schematic perspective view showing another example of a packaging container using a gas barrier film according to the present invention.

Figure 10:
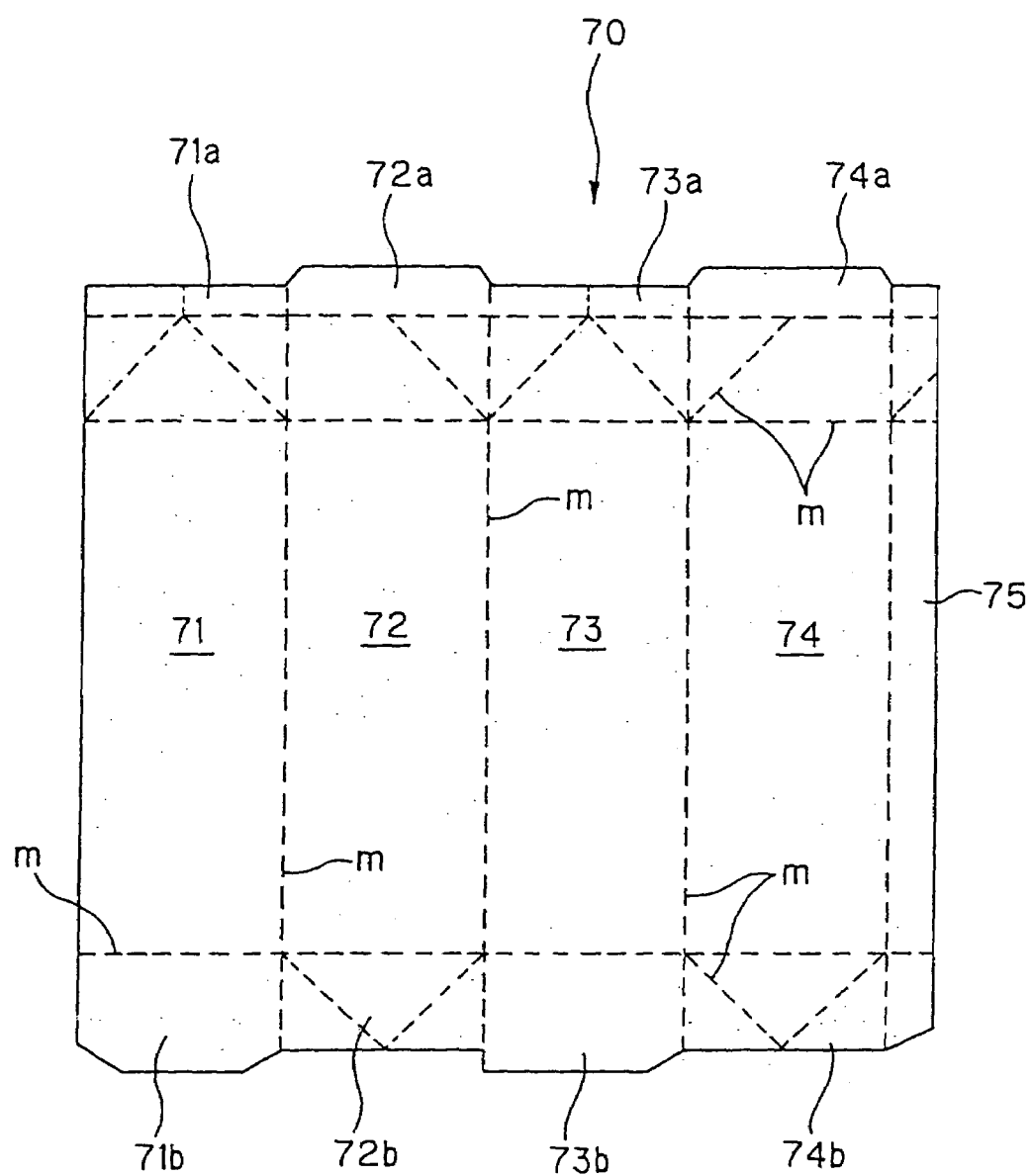

FIG. 10 is a plane view of a blank plate used for the production of the packaging container shown in FIG. 9.

Figure 11:
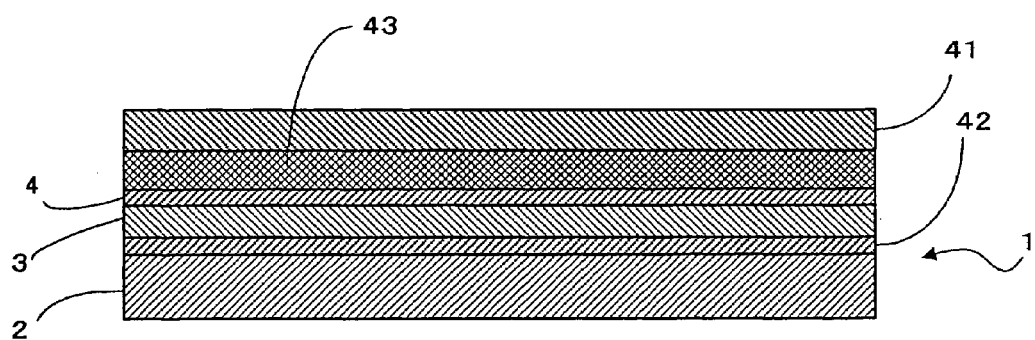

FIG. 11 is a schematic sectional view showing one example of a laminate material (second embodiment) using a gas barrier film according to the present invention.

Figure 12:
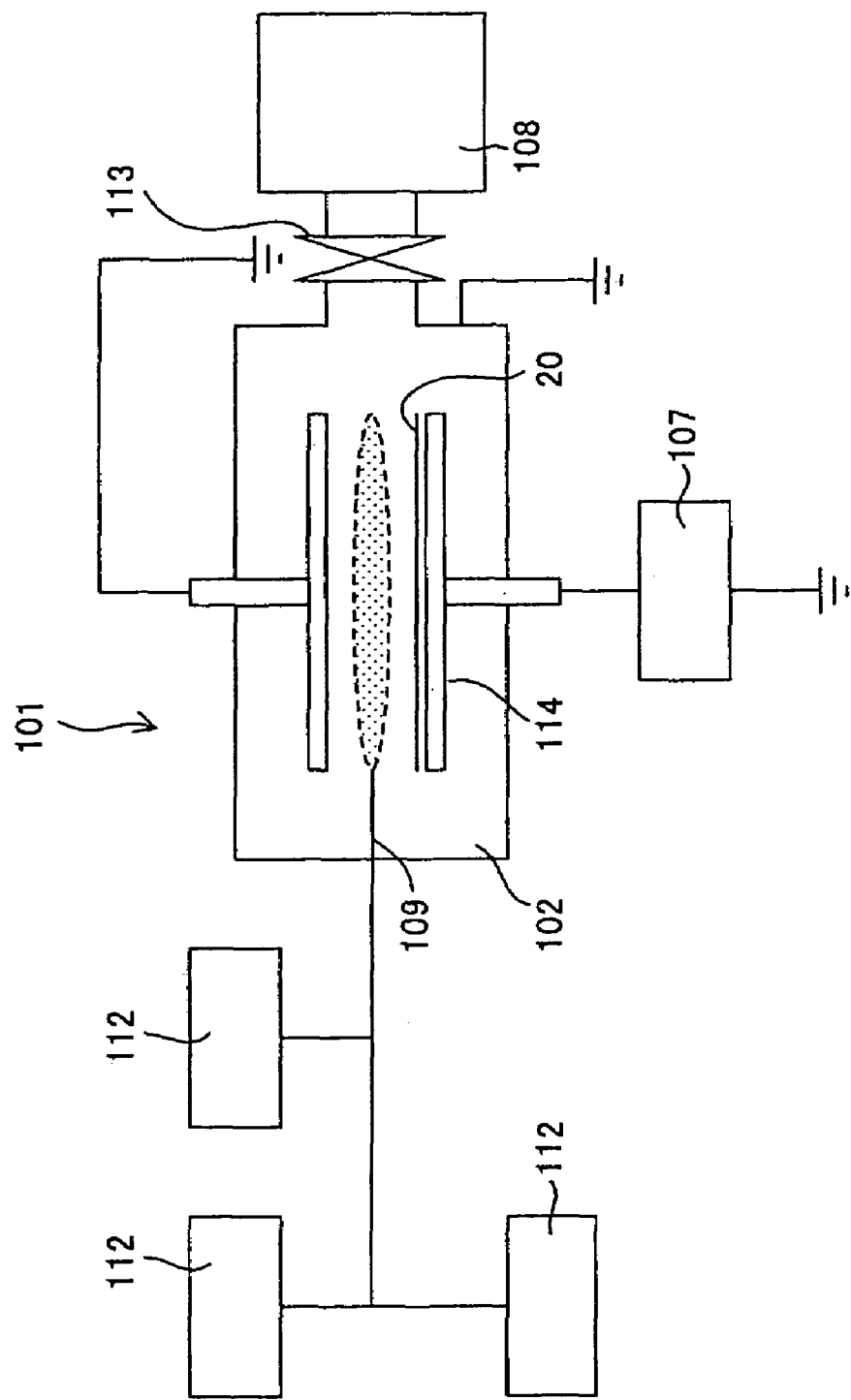

FIG. 12 is a structural view showing one example of a plasma CVD apparatus.

Figure 13:
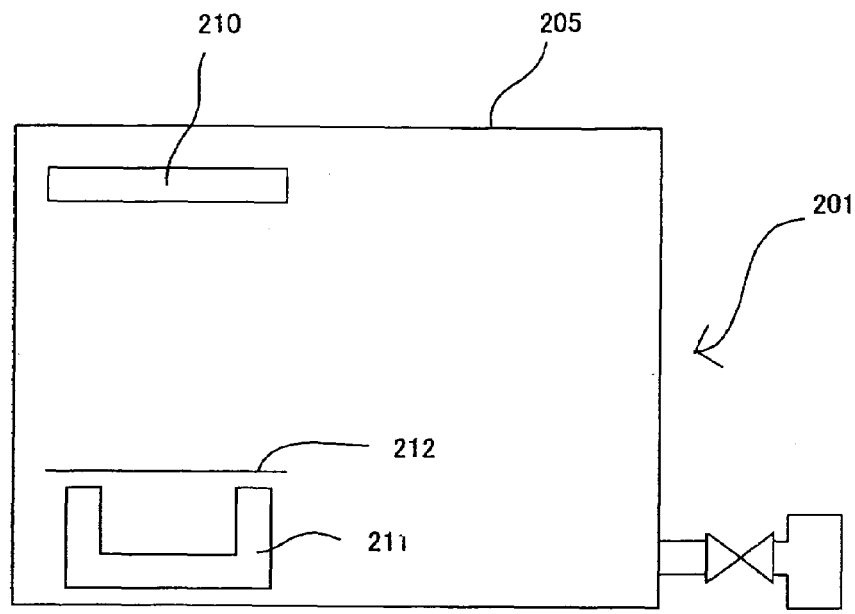

FIG. 13 is a structural view showing one example of a vacuum deposition.

Figure 14:
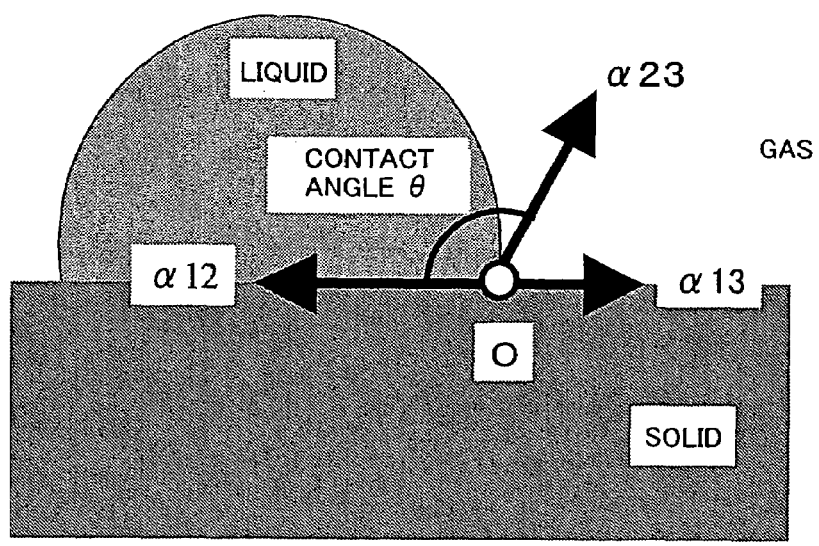

FIG. 14 is an explanatory view for explaining contact angle.

DESCRIPTION OF THE REFERENCE NUMBERS

1 . . . gas barrier film
2 . . . substrate
3 . . . gas barrier layer
4 . . . water-repellent layer
11, 21, 31 . . . laminate material
13, 23, 33 . . . heat sealing resin layer

The invention claimed is:

1. A laminate material comprising a conductive layer formed on at least one surface of a gas barrier film comprising a substrate, a gas barrier layer which is a transparent layer formed of an inorganic oxide, formed on one surface or both surfaces of the substrate, and a water-repellent layer which is a film having water repellency, formed directly on the gas barrier layer,
wherein the water-repellent layer is an organic film comprising a metal skeleton and having a methyl group, formed by a vacuum deposition method, and
the organic film comprising a metal skeleton and having a methyl group is an organic silicon type material represented by $Si_x(CH_3)_y$ or $(SiO)_x(CH_3)_y$ or its polymer film.

2. A laminate material according to claim 1, wherein the gas barrier film further comprises a water-repellent layer which is a film having water repellency, formed between the substrate and the gas barrier layer.

3. A laminate material according to claim 1, wherein the contact angle with water on the surface of the water-repellent layer is 60° or more (measuring temperature: 23° C.).

4. A laminate material according to claim 1, wherein the film thickness of the water-repellent layer is in a range from 1 nm to 1000 nm.

5. A laminate material according to claim 1, wherein the gas barrier layer and water-repellent layer are laminated plurally.

6. A laminate material according to claim 5, wherein a total of five layers of the water-repellent layer and gas barrier layer are laminated in this order.

7. A laminate material according to claim 1, wherein the gas barrier film has an oxygen transmission rate of 0.5 $cc/m^2/day$ or less and a water vapor transmission rate of 0.5 $g/m^2/day$ or less.

8. An image display medium produced by using the laminate material as claimed in claim 1 as a substrate and by forming an image display layer on the conductive layer.

9. An image display medium according to claim 8, wherein the gas barrier film further comprises a water-repellent layer which is a film having water repellency, formed between the substrate and the gas barrier layer.

10. A laminate material comprising a conductive layer formed on at least one surface of a gas barrier film comprising a substrate, a gas barrier layer which is a transparent layer formed of an inorganic oxide, formed on one surface or both surfaces of the substrate, and a water-repellent layer which is a film having water repellency, formed directly on the gas barrier layer,
wherein the water-repellent layer is a film containing fluorine (F). formed by a vacuum deposition method, and
the film containing fluorine (F) is an organic silicon fluoride material represented by $Si_xC_yF_z$ or its polymer film, a silicon fluoride material represented by $Si_xF_y$ or its polymer film, or a fluorine-containing hydrocarbon type material represented by $C_xF_y$ or its polymer film.

11. A laminate material according to claim 10, wherein the gas barrier film further comprises a water-repellent layer which is a film having water repellency, formed between the substrate and the gas barrier layer.

12. A laminate material according to claim 10, wherein the contact angle with water on the surface of the water-repellent layer is 60° or more (measuring temperature: 23° C.).

13. A laminate material according to claim 10, wherein the film thickness of the water-repellent layer is in a range from 1 nm to 1000 nm.

14. A laminate material according to claim 10, wherein the gas barrier layer and water-repellent layer are laminated plurally.

15. A laminate material according to claim 14, wherein a total of five layers of the water-repellent layer and gas barrier layer are laminated in this order.

16. A laminate material according to claim 10, wherein the gas barrier film has an oxygen transmission rate of 0.5 $cc/m^2/day$ or less and a water vapor transmission rate of 0.5 $g/m^2/day$ or less.

17. An image display medium produced by using the laminate material as claimed in claim 10 as a substrate and by forming an image display layer on the conductive layer.

18. An image display medium according to claim 17, wherein the gas barrier film further comprises a water-repellent layer which is a film having water repellency, formed between the substrate and the gas barrier layer.

* * * * *